US012677330B2

(12) United States Patent
Moon

(10) Patent No.: US 12,677,330 B2
(45) Date of Patent: Jul. 7, 2026

(54) METHOD AND APPARATUS FOR CONTROLLING DATA TRANSMISSION ACCORDING TO QUALITY OF SERVICE IN WIRELESS COMMUNICATION SYSTEM

(71) Applicant: Samsung Electronics Co., Ltd., Suwon-si (KR)

(72) Inventor: Sangjun Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 446 days.

(21) Appl. No.: 18/312,341

(22) Filed: May 4, 2023

(65) Prior Publication Data

US 2023/0363023 A1 Nov. 9, 2023

(30) Foreign Application Priority Data

May 4, 2022 (KR) ........................ 10-2022-0055447

(51) Int. Cl.
*H04W 76/10* (2018.01)
(52) U.S. Cl.
CPC .................................... *H04W 76/10* (2018.02)
(58) Field of Classification Search
CPC .................................................... H04W 76/10
(Continued)

(56) References Cited

U.S. PATENT DOCUMENTS 11,057,865 B1 7/2021 Wong et al.
2019/0191467 A1* 6/2019 Dao ...................... H04W 76/11
(Continued)

FOREIGN PATENT DOCUMENTS

KR 10-2021-0051375 A 5/2021
WO 2018194315 A1 10/2018
(Continued)

OTHER PUBLICATIONS

3GPP TR 23.700-74 v0.2.0, 3rd Generation Partnership Project, Technical Specification Group Services and System Aspects, Study on generic group management, exposure and communication enhancements (GMEC) (Release 18), Apr. 2022 (Year: 2022).*
(Continued)

*Primary Examiner* — Nicholas R Taylor
*Assistant Examiner* — Chong G Kim

(57) ABSTRACT

The disclosure relates to a 5G or 6G communication system for supporting a higher data transmission rate. The present disclosure provides method and apparatus for controlling data transmission according to quality of service in wireless communication system. A method performed by an access and mobility management function (AMF) in a wireless communication system comprises receiving, from a user equipment (UE), protocol data unit (PDU) session establish request information for supporting a plurality of groups, selecting, based on the received PDU session establish request information, a first session management function (SMF) that matches a first group among the plurality of groups, and selecting a second SMF that matches a second group among the plurality of groups and transmitting a first PDU session establish request message to the selected first SMF, and transmitting a second PDU session establish request message to the selected second SMF.

20 Claims, 13 Drawing Sheets

(58) Field of Classification Search

USPC ........................................................ 370/328

See application file for complete search history.

(56) References Cited

U.S. PATENT DOCUMENTS

| | | | | |
|---|---|---|---|---|
| 2020/0128432 | A1 | 4/2020 | Youn et al. | |
| 2020/0351969 | A1* | 11/2020 | Miklós | H04W 4/70 |
| 2020/0351984 | A1 | 11/2020 | Talebi Fard et al. | |
| 2020/0383006 | A1 | 12/2020 | Trivisonno et al. | |
| 2021/0067396 | A1 | 3/2021 | Selvanesan et al. | |
| 2021/0167897 | A1 | 6/2021 | Seidel et al. | |
| 2022/0039109 | A1 | 2/2022 | Shaw | |
| 2022/0103588 | A1 | 3/2022 | Shaw | |
| 2022/0103596 | A1 | 3/2022 | Shaw | |
| 2022/0182861 | A1* | 6/2022 | Youn | H04W 24/08 |
| 2024/0349364 | A1* | 10/2024 | Qiao | H04W 76/10 |
| 2024/0372899 | A1* | 11/2024 | Tao | H04W 76/12 |
| 2025/0070999 | A1* | 2/2025 | Li | H04L 12/4633 |

FOREIGN PATENT DOCUMENTS

| | | | | | |
|---|---|---|---|---|---|
| WO | WO-2023280166 | A1 * | 1/2023 | ............ | H04W 76/10 |
| WO | WO-2023103649 | A1 * | 6/2023 | ............ | H04L 51/04 |
| WO | WO-2023165277 | A1 * | 9/2023 | ............ | H04W 76/10 |

OTHER PUBLICATIONS

International Search Report and Written Opinion of the International Searching Authority dated Aug. 1, 2023, in connection with International Application No. PCT/KR2023/006104, 9 pages.

3GPP TR 23.700-74 V0.2.0 (Apr. 2022), Technical Report, 3rd Generation Partnership Project; Technical Specification Group Services and System Aspects; Study on generic group management, exposure and communication enhancements (GMEC) (Release 18), Apr. 2022, 55 pages.

Supplementary European Search Report dated Sep. 6, 2024, in connection with European Application No. 23799699.6, 15 pages.

Huawei, et al., "New SID on generic group management, exposure and communication enhancements," S2-2108574 (revision of S2-2108163), 3GPP TSG-WG SA2 Meeting #148E e-meeting, Nov. 15-22, 2021, 5 pages.

Samsung, "Revision of Solution #7 a PDU Session with multiple groups for KI#5," S2-2203272 (revision of S2-2202609r05), 3GPP TSG-WG SA2 Meeting #150E e-meeting, Apr. 6-12, 2022, 4 pages.

3GPP TR 23.700-74 V0.1.0 (Feb. 2022), Technical Report, 3rd Generation Partnership Project; Technical Specification Group Services and System Aspects; Study on generic group management, exposure and communication enhancements (GMEC) (Release 18), Feb. 2022, 25 pages.

* cited by examiner

Figure 7B:
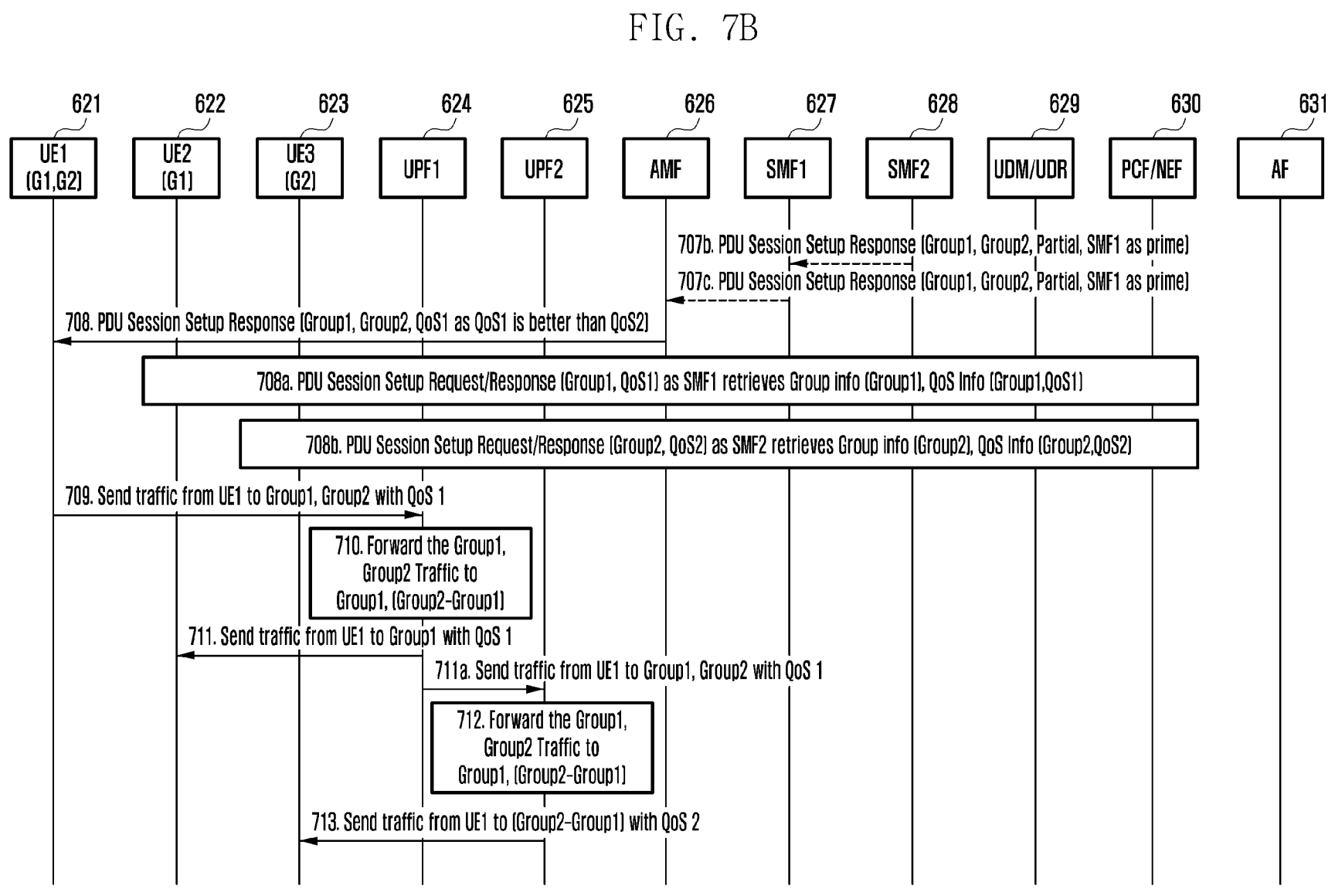

630 PCF/NEF

629 UDM/UDR

628 SMF2

627 SMF1

626 AMF

625 UPF2

624 UPF1

623 UE3 [G2]

622 UE2 [G1]

621 UE1 [G1,G2]

707b. PDU Session Setup Response [Group1, Group2, Partial, SMF1 as prime]

707c. PDU Session Setup Response [Group1, Group2, Partial, SMF1 as prime]

708. PDU Session Setup Response [Group1, Group2, QoS1 as QoS1 is better than QoS2]

708a. PDU Session Setup Request/Response [Group1, QoS1] as SMF1 retrieves Group info [Group1], QoS Info [Group1,QoS1]

708b. PDU Session Setup Request/Response [Group2, QoS2] as SMF2 retrieves Group info [Group2], QoS Info [Group2,QoS2]

709. Send traffic from UE1 to Group1, Group2 with QoS 1

710. Forward the Group1, Group2 Traffic to Group1, [Group2-Group1]

711. Send traffic from UE1 to Group1 with QoS 1

711a. Send traffic from UE1 to Group1, Group2 with QoS 1

712. Forward the Group1, Group2 Traffic to Group1, [Group2-Group1]

713. Send traffic from UE1 to [Group2-Group1] with QoS 2

FIG. 8A

METHOD AND APPARATUS FOR CONTROLLING DATA TRANSMISSION ACCORDING TO QUALITY OF SERVICE IN WIRELESS COMMUNICATION SYSTEM

CROSS-REFERENCE TO RELATED APPLICATION

This application is based on and claims priority under 35 U.S.C. § 119 to Korean Patent Application No. 10-2022-0055447, filed on May 4, 2022, in the Korean Intellectual Property Office, the disclosure of which is herein incorporated by reference in its entirety.

BACKGROUND

1. Field

The disclosure relates to a method and apparatus for supporting a plurality of groups in a wireless communication network and, more particularly, to a method and apparatus for supporting establishment of a protocol data unit (PDU) session for supporting a plurality of groups in the 3GPP 5$^{th}$ generation (5G) system (5GS).

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

In a 5th generation system (5GS) that has been standardized in 3GPP, utilization of a smart energy infrastructure has been considered. A smart energy infrastructure using the 5GS needs to support group communication in which applications have different QoS requirements when various applications transmit data via a single user equipment (UE). Therefore, a plurality of groups needs to be supported in a single UE. In addition, each group satisfies a different QoS requirement. In case that a single application in the UE transmits data to a plurality of groups, the same data needs to be transmitted to each group and thus, the same data may be transmitted as many times as the number of groups. Therefore, in the case that the number of groups to which data needs to be simultaneously transmitted is increased, unnecessary redundant transmission may also be increased. Therefore, in the case that the number of groups to which data needs to be simultaneously transmitted is increased, unnecessary redundant transmission may also be increased.

In order to support 5G virtual network (VN) group communication, a system (5GS) of a 3GPP network controls a PDU session anchor (PSA) user plane function (UPF) to which each UE is connected, so as to exchange data with anther UE and/or data network (DN). There may be a plurality of PSA UPFs connected to each UE, and thus interfaces for transferring data among the plurality of PSA UPFs may be needed and data transmission therethrough may need to be configured for the PSA UPFs. To take charge of such a control, a single session management function (SMF) may configure forwarding information between UEs for group communication.

Establishing a PDU session may be considered to support a plurality of groups that require a plurality of QoSs. However, in case that each SMF has restriction for each group, the restriction of a service area may be present, or a plurality of SMFs control PSA UPFs in a distribute manner such as the case in which an SMF is allocated for each tracking area (TA), information that each SMF is aware of is limited, and controllable PSA UPFs are also limited and thus, forwarding information between UEs for the entire 5G VN group communication may not be configured.

Therefore, the disclosure provides a method and apparatus for establishing a PDU session for supporting a plurality of groups that require a plurality of QoSs in an SMF.

In addition, the disclosure provides a method and apparatus for establishing a PDU session by overcoming restriction of a service area in an SMF.

In addition, the disclosure provides a method and apparatus for establishing a PDU session without the restriction of a tracking area (TA) in an SMF.

In addition, the disclosure provides a method and apparatus for establishing forwarding information between UEs for the entire 5G VN group communication in an SMF.

According to an embodiment of the disclosure, there is provided a data transmission control method according to quality of service (QoS) in a session management function (SMF) in a wireless communication system, the method including an operation of receiving, from an access and mobility management function (AMF), a protocol data unit (PDU) session request requested by a first user equipment (UE), wherein the PDU session setup request (or PDU session establish request) includes information indicating group information associated with two or more groups and a partial indication indicating that the SMF is in charge of some of the groups, an operation of selecting a second SMF for taking charge of at least one of the groups, an operation of transmitting the PDU session setup request to the selected second SMF, an operation of receiving information associated with the groups from a user data repository (UDR), and an operation of requesting, from a user plane function (UPF), traffic forwarding and QoS based on information associated with the groups.

According to another embodiment of the disclosure, there is provided a method performed by an access and mobility management function (AMF) in a wireless communication system, the method including an operation of receiving, from a user equipment (UE), protocol data unit (PDU) session establish request information for supporting a plurality of groups, an operation of selecting, based on the received PDU session establish request information, a first session management function (SMF) that matches a first group among the plurality of groups, and selecting a second SMF that matches a second group among the plurality of groups, and an operation of transmitting a first PDU session establish request message to the selected first SMF, and transmitting a second PDU session establish request message to the selected second SMF, wherein the first PDU session establish request message includes information associated with the first group and the second group among the PDU session establish request information for supporting the plurality of groups, and the second PDU session establish request message includes information associated with the first group and the second group among the PDU session establish request information for supporting the plurality of groups.

According to another embodiment of the disclosure, there is provided a method performed by a first session management function (SMF) in a wireless communication system, the method including an operation of receiving, from an access and mobility management function (AMF), a PDU session establish request message for supporting a plurality of groups, and an operation of transmitting, to the AMF, a PDU session establish response message, wherein the PDU session establish request message includes information associated with a second SMF and PDU session establish request information for supporting the plurality of groups, the PDU session establish request information is information received by the AMF from a user equipment (UE) in order to support the plurality of groups, the first SMF matches a first group among the plurality of groups, and the second SMF matches a second group among the plurality of groups.

According to another embodiment of the disclosure, there is provided an access and mobility management function (AMF) in a wireless communication network, the AMF including a transceiver configured to transmit or receive a signal and a controller, which is configured to perform control so as to: receive, from a user equipment (UE), protocol data unit (PDU) session establish request information for supporting a plurality of groups; select, based on the received PDU session establish request information, a first session management function (SMF) that matches a first group among the plurality of groups and select a second SMF that matches a second group among the plurality of groups; and transmit a first PDU session establish request message to the selected first SMF and transmit a second PDU session establish request message to the selected second SMF, wherein the first PDU session establish request message includes information associated with the first group and the second group among the PDU session establish request information for supporting the plurality of groups, and the second PDU session establish request message includes information associated with the first group and the second group among the PDU session establish request information for supporting the plurality of groups.

According to another embodiment of the disclosure, there is provided a first session management function (SMF) in a wireless communication network, the first SMF including a transceiver configured to transmit or receive a signal and a controller, which is configured to perform control so as to: receive, from an access and mobility management function (AMF), a PDU session establish request message for supporting a plurality of groups; and transmit, to the AMF, a PDU session establish response message, wherein the PDU session establish request message includes information associated with a second SMF and PDU session establish request information for supporting the plurality of groups, the PDU session establish request information is information received by the AMF from the UE in order to support the plurality of groups, the first SMF matches a first group among the plurality of groups, and the second SMF matches a second group among the plurality of groups.

According to the disclosure, although a single SMF does not support a plurality of groups in the 5GS, a PDU session for supporting multi-group communication (group communications) may be configured. That is, according to the disclosure, a PDU session for supporting a plurality of groups that require a plurality of QoSs may be configured. In addition, according to the disclosure, a PDU session may be configured by overcoming restriction of a service area. In addition, according to the disclosure, a PDU session may be configured without restriction of a tracking area (TA). In addition, according to the disclosure, forwarding information between UEs for the entire 5G VN group communication may be configured.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates a method of establishing a PDU session with respect to a plurality of groups that support different QoS requirements according to another embodiment of the present disclosure;

FIG. 4 illustrates a problem of 5G VN group communications when a plurality of SMFs are used according to another embodiment of the present disclosure;

FIG. 5 illustrates a scheme of 5G VN group communications when a plurality of SMFs are used according to an embodiment of the present disclosure;

FIG. 6A illustrates a signal flowchart of establishing a PDU session that supports a plurality of groups by designating one of a plurality of SMFs as a representative SMF according to another embodiment of the present disclosure;

FIG. 7A illustrates a signal flowchart of establishing a PDU session that supports a plurality of groups by simultaneously performing signaling with respect to a plurality of SMFs according to another embodiment of the present disclosure;

FIG. 7B illustrates a signal flowchart of establishing a PDU session that supports a plurality of groups by simultaneously performing signaling with respect to a plurality of SMFs according to another embodiment of the present disclosure;

FIG. 8A illustrates a signal flowchart of establishing a PDU session that supports a plurality of groups by sequentially performing signaling with respect to a plurality of SMFs according to another embodiment of the present disclosure;

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description, the disclosure will be described using terms and names defined in the 5GS and NR standards, which are the latest standards specified by the 3rd generation partnership project long term evolution (3GPP LTE) among the existing communication standards, for the convenience of description. However, the disclosure is not limited by these terms and names, and may be applied in the same way to systems that conform other standards. In particular, the disclosure may be applied to the 3GPP 5GS/NR (5th generation mobile communication standards).

Figure 1:
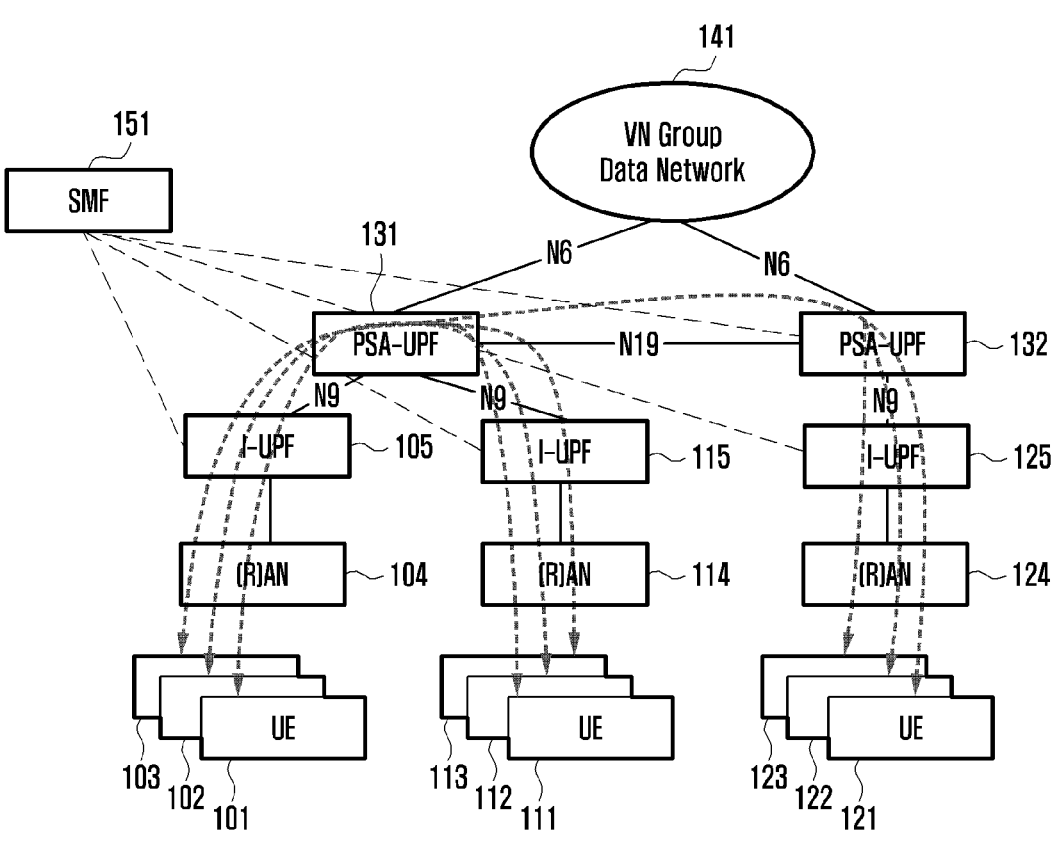
FIG. 1 illustrates a method for a 5G virtual network (VN) group communications method according to another embodiment of the present disclosure.

FIG. 1 illustrates a diagram illustrating a 5G virtual network (VN) group communications method according to an embodiment of the present disclosure.

Referring to FIG. 1, it is illustrated that a plurality of UEs 101, 102, 103, 111, 112, 113, 121, 122, and 123 access (radio) access networks (R)ANs 104, 114, and 124 which are corresponding base stations. The (R)ANs 104, 114, and 124 may have their own communication areas or boundaries. It is illustrated that the first UE 101, the second UE 102, and the third UE 103 are located in the area of the first (R)AN 104, the fourth UE 111, the fifth UE 112, and the sixth UE 113 are located in the area of the second (R)AN 114, and the seventh UE 121, the eighth UE 122, and the ninth UE 123 are located in the area of the third (R)AN 124.

In addition, FIG. 1 illustrates that the first (R)AN 104 is connected to a first I-UPF 105, the second (R)AN 114 is connected to a second I-UPF 115, and the third (R)AN 124 is connected to a third I-UPF 125. FIG. 1 illustrates the case in which the first I-UPF 105, the second I-UPF 115, and the third I-UPF 125 are connected to same SMF 151. The I-UPF is an abbreviation of an intermediate-UPF, and is in charge of connecting an (R)AN and a PDU session anchor (PSA) UPF that has a function of performing final routing with a DN. A plurality of I-UPFs may be present between a PSA UPF and an (R)AN.

Each of the first I-UPF 105 and the second I-UPF 115 may be connected, via an N9 interface, to a first PSA-UPF 131 that is connected to a VN group DN 141, and the third I-UPF 125 may be connected, via an N9 interface, to a second PSA-UPF 132 that is connected to the VN group DN 141. In addition, the first PSA-UPF 131 and the second PSA-UPF 132 may be connected via an N19 interface, and each of the first PSA-UPF 131 and the second PSA-UPF 132 may be connected to the VN group DN 141 via an interface N6.

Operations associated with network functions illustrated in FIG. 1 which are known from the standard up to the present will be described.

The UPFs 105, 115, 125, and 131, and 132 may transfer a downlink protocol data unit (PDU) received from a data network (DN) to the UEs 101, 102, 103, 111, 112, 113, 121, 122, and 123 via corresponding (R)ANs 104, 114, and 124. In addition, a UPF may transfer an uplink PDU received from a UE to the DN 141 via the (R)ANs 104, 114, and 124. Specifically, the UPF may support functions such as an anchor point for intra/inter RAT mobility, an external PDU session point of interconnection (interconnect) with the DN 141, packet routing and forwarding, a user plane part of implementation of policy rules and packet inspection, lawful intercept, reporting the amount of traffic used, an uplink classifier for supporting routing of a traffic flow to a data network, a branching point for supporting a multi-homed PDU session, QoS handling for a user plane (e.g., packet filtering, gating, implementing uplink/downlink rate), verifying uplink traffics (a service data flow (SDF) mapping between an SDF and a QoS flow), marking a transport level packet in an uplink and downlink, buffering a downlink packet, triggering a downlink data notification, and the like. Some or all of the functions of the UPF may be supported in a single instance of a single UPF.

The SMF 151 may provide a session management function, and in case that a UE has a plurality of sessions, the sessions may be managed by SMFs different from each other. Specifically, the SMF 151 may support functions such as session management (e.g., establishing, correcting, and releasing a session including maintaining a tunnel between a UPF and a RAN node), allocating and managing a UE IP address (optionally including authentication), selecting and controlling a UP function, setting traffic steering for routing traffic from a UPF to an appropriate destination, termination of an interface for policy control functions, enforcing a control part of a policy and quality of service (QoS), lawful intercept (with respect to an SM event and an interface to an L1 system), termination of an SM part of a NAS message, downlink data notification, an initiator of AN-specific SM information (transferring to a RAN through N2 via an AMF), determining an SSC mode of a session, a roaming function, and the like. Some or all of the functions of the SMF 151 may be supported in a single instance of a single SMF.

The SMF 151 will be additionally described when embodiments including operations in addition to the above-described operations are described. In addition, other NFs will be additionally described when embodiments including operations in addition to the above-described operations are described.

In the 5G VN 141, in case that a UE that establishes a PDU session for each group based on a data network name (DNN) transmits data to another UE in the group, a PSA UPF transmits (forward) the data to the corresponding UE. In case that a transmission UE and a reception UE are connected to different PSA UPFs, data may be transmitted from a PSA UPF in which the transmission UE is located to a PSA UPF in which the reception UE is located, via an N19 interface that is a connection between the PSA UPFs.

FIG. 1 illustrates the case in which each of the UEs 101, 102, 103, 111, 112, 113, 121, 122, and 123 in FIG. 1 transmits, via corresponding NFs, data to other UEs, for example, a UE in the same RAN, a UE located in a different RAN, a UE located in the same UPF, or a UE in a management area of a different UPF.

Figure 2:
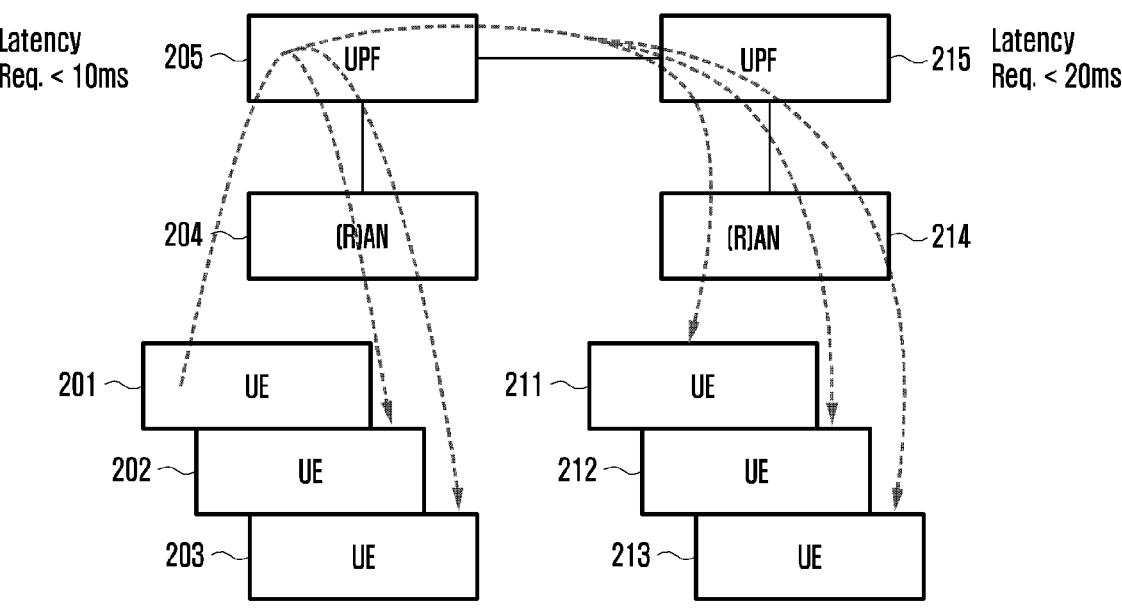
FIG. 2 illustrates a multi-group communication (group communications) that supports different QoS requirements according to another embodiment of the present disclosure.

FIG. 2 illustrates a multi-group communication (group communications) that supports different QoS requirements according to an embodiment of the present disclosure.

First, before referring to FIG. 2, although FIG. 2 uses reference numerals different from those of FIG. 1, a basic operation and/or basic function of each of the NFs may be the same as the NFs described with reference to FIG. 1.

Different UEs 201, 202, and 203 may be located in a RAN 204, and other different UEs 211, 212, and 213 may be located in a RAN 214. In addition, it is assumed that the case in which the RAN 204 is connected to a higher layer via a UPF 205, and another RAN 215 is connected via another UPF 215. In this instance, referring to FIG. 2, the case in which data is transmitted for smart energy will be described.

A single DNN is used for each PDU session, and a single DNN is mapped to a single group, and thus inter-group communication has been configured to use a single group and to use a single QoS. For smart energy, a UE may transmit data to a plurality of groups having different QoS requirements. For example, in case that a single UE transmits data, the data may be transmitted to other neighboring UEs with QoS that secures latency within 10 ms, and the data may be transmitted to other UEs located far more distant from the UE with QoS that secures within 20 ms. In case of data transmission by the UE 201 in FIG. 2, data transmission to the UEs 202 and 203 in the same RAN 204 or in the same UPF 205 may secure latency within 10 ms. In addition, in case of data transmission by the UE 201, it is illustrated that data transmission to the UEs 211, 212, and 213 located in the UPF 215 or the different RAN 214 may be performed with QoS that secures latency within 20 ms.

Figure 3:
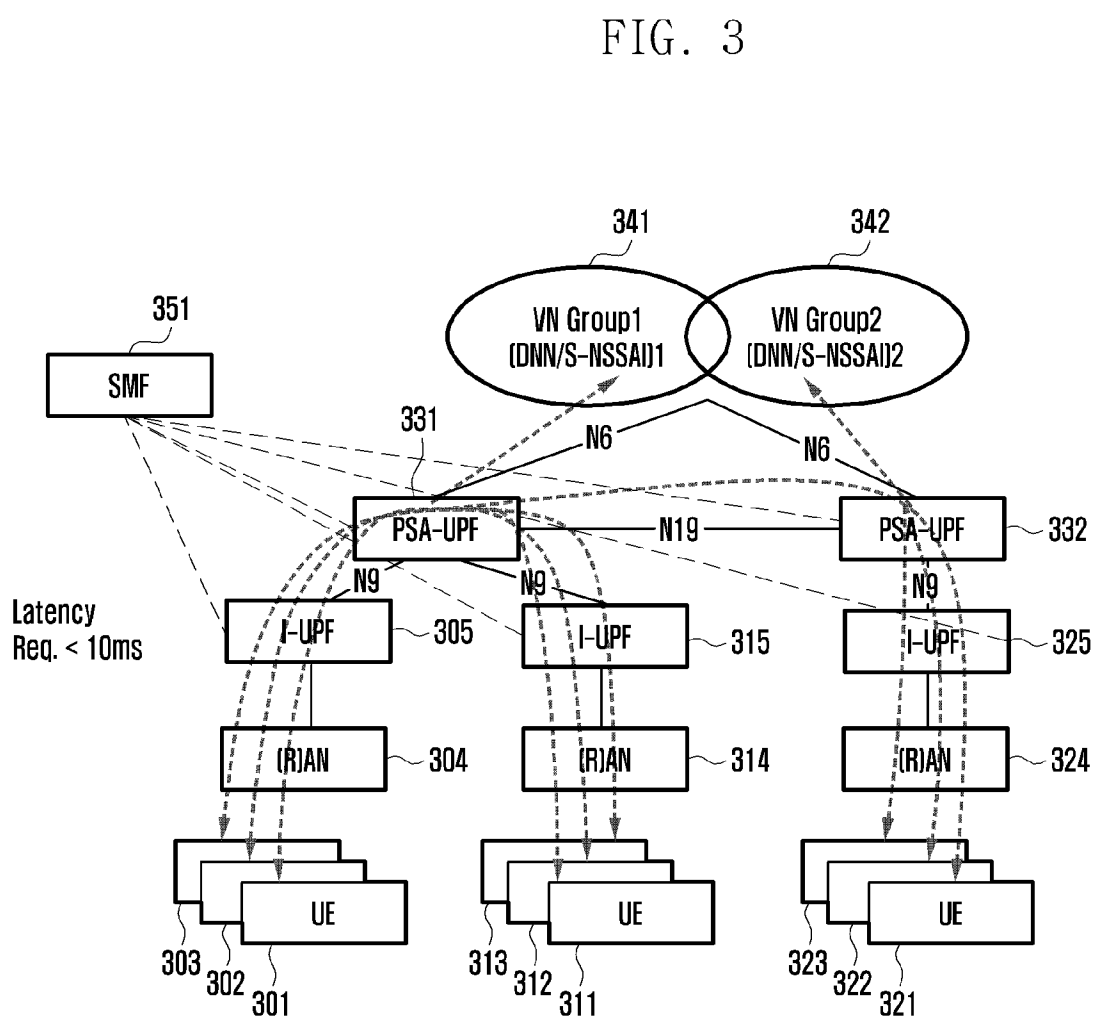

FIG. 3 illustrates a method of establishing a PDU session with respect to a plurality of groups that support different QoS requirements according to an embodiment of the present disclosure.

First, FIG. 3 uses reference numerals different from those of FIGS. 1 and 2 that have described above. This is for ease of description, and a basic operation and/or basic function of each of the NFs may be the same as the NFs described above.

When compared to the configuration of FIG. 3 to FIG. 1, it is illustrated that a plurality of UEs 301, 302, 303, 311, 312, 313, 321, 322, and 323 access (radio) access networks (R)ANs 304, 314, and 324 which are corresponding base stations. The (R)ANs 304, 314, and 324 may have their own communication areas or boundaries. It is illustrated that the first UE 301, the second UE 302, and the third UE 303 are located in the area of the first (R)AN 304, the fourth UE 311, the fifth UE 312, and the sixth UE 313 are located in the area of the second (R)AN 314, and the seventh UE 321, the eighth UE 322, and the ninth UE 323 are located in the area of the third (R)AN 324.

In addition, FIG. 3 illustrates that the first (R)AN 304 is connected to a first I-UPF 305, the second (R)AN 314 is connected to a second I-UPF 315, and the third (R)AN 324 is connected to a third I-UPF 325. FIG. 3 illustrates the case in which the first I-UPF 305, the second I-UPF 315, and the third I-UPF 325 are connected same SMF 351.

FIG. 3 illustrates that each of the first I-UPF 305 and the second I-UPF 315 is connected, via an N9 interface, to a first PSA-UPF 331 that is connected to the VN Group1 DN 341. In addition, the third I-UPF 325 is connected, via an N9 interface, to the second PSA-UPF 332 that is connected to the VN Group2 DN 342. In addition, the first PSA-UPF 331 and the second PSA-UPF 332 may be connected via an N19 interface.

A method according to FIG. 3 is a method of establishing a PDU session using a plurality of DNNs corresponding to a plurality of groups, and the procedure thereof is as follows.

In one example of Step 0, an application function (AF) (not illustrated in FIG. 3) configures a plurality of groups in the 5GS. Each group may be configured to have a different QoS requirement. In this instance, a QoS policy to be actually supported may be determined by mapping a QoS requirement of each group to a policy in a network. The number of types of QoS requirement that the AF requests and the number of QoS policies that a policy control function (PCF) (not illustrated in FIG. 3) actually determines to support may be different from each other. Although the AF requests 5 groups and 5 different QoS requirements, the QoS Policies that the PCF performs mapping and actually supports may be 4 types of QoS policies.

Here, the basic operation of a PCF will be described briefly. The PCF receives information associated with a packet flow from an application server (or an AF), and provides a function of determining a policy associated with mobility management, session management, and the like. Particularly, the PCF may support functions such as supporting a unified policy framework to control network operations, providing policy rules so that a control plane (CP) function(s) (e.g., an access and mobility management function (AMF), an SMF, and the like) implements the policy rules, embodying a front end for accessing related subscription information for determining a policy in a user data repository (UDR).

In one example of Step 1, a predetermined UE requests establishment of a PDU session by using a plurality of DNNs corresponding to a plurality of groups. The AMF that receives the request may select an SMF based on a DNN having the highest priority, or may select an SMF that support all of the plurality of DNNs. The DNN having the highest priority may be configured in advance in the AMF, the DNN having the highest QoS policy based on the configured QoS information read by the PCF may be determined as the DNN having the highest priority, or the DNN having the highest priority may be determined based on an order of DNNs included in a PDU session establish request.

Here, a basic operation of the above-described AMF will be described. The AMF provides an access and mobility management function based on a UE unit, and basically, a single UE accesses a single AMF. Specifically, the AMF may support functions such as signaling between CN nodes for mobility among 3GPP access networks, termination of a radio access network (RAN) CP interface (i.e., N2 interface), termination of a non access stratum (NAS) signaling (N1), NAS signaling security (NAS ciphering and integrity protection), AS security control, registration management (registration area management), connection management, an idle mode UE reachability (including controlling and performing of paging retransmission), mobility management control (subscription and policy), supporting an intra-system mobility and inter-system mobility, supporting network slicing, selecting an SMF, lawful intercept (with respect to an AMF event and an interface to an L1 system), providing delivery of a session management (SM) message between a UE and an SMF, a transparent proxy for routing an SM message, access authentication, access authorization including checking of the right of roaming, providing delivery of an SMS message between a UE and an SMSF, a security anchor function (SAF), and/or security context management (SCM), and the like. Some or all of the functions of an AM may be supported in a single instance of a single AMF.

In one example of Step 2, the SMF may receive upper-group information and sub-group information from a UDR, and may identify member information associated with the sub-group. The SMF may receive, from a PCF, a QoS policy for each sub-group.

In one example of Step 3, the SMF may request a UPF to configure a forwarding table according to sub-group information, and may configure QoS according to the QoS policy of the sub-group.

In one example of Step 4, the UPF may configure a forwarding table in response to the request from the SMF. In the case of configuration of the forwarding table, forwarding with respect to a sub-group having high QoS may be configured to have a higher priority than that of forwarding with respect to a sub-group having low QoS. The priority of forwarding for each group may be determined based on the QoS policy level mapped in step 0, and thus there may be 4 forwarding levels of which priorities are distinguished although the number of sub-groups is 5.

In one example of Step 5, the UE may transmit data with the highest QoS among QoSs of sub-groups. The UPF that receives data may perform traffic transmission with respect to a sub-group having the highest QoS, and may transmit traffic associated with a sub-group having a second highest QoS among the remaining recipients. When needed, a process of transmitting traffic associated with a sub-group having a next highest QoS among the remaining recipients may be repeated.

Figure 4:
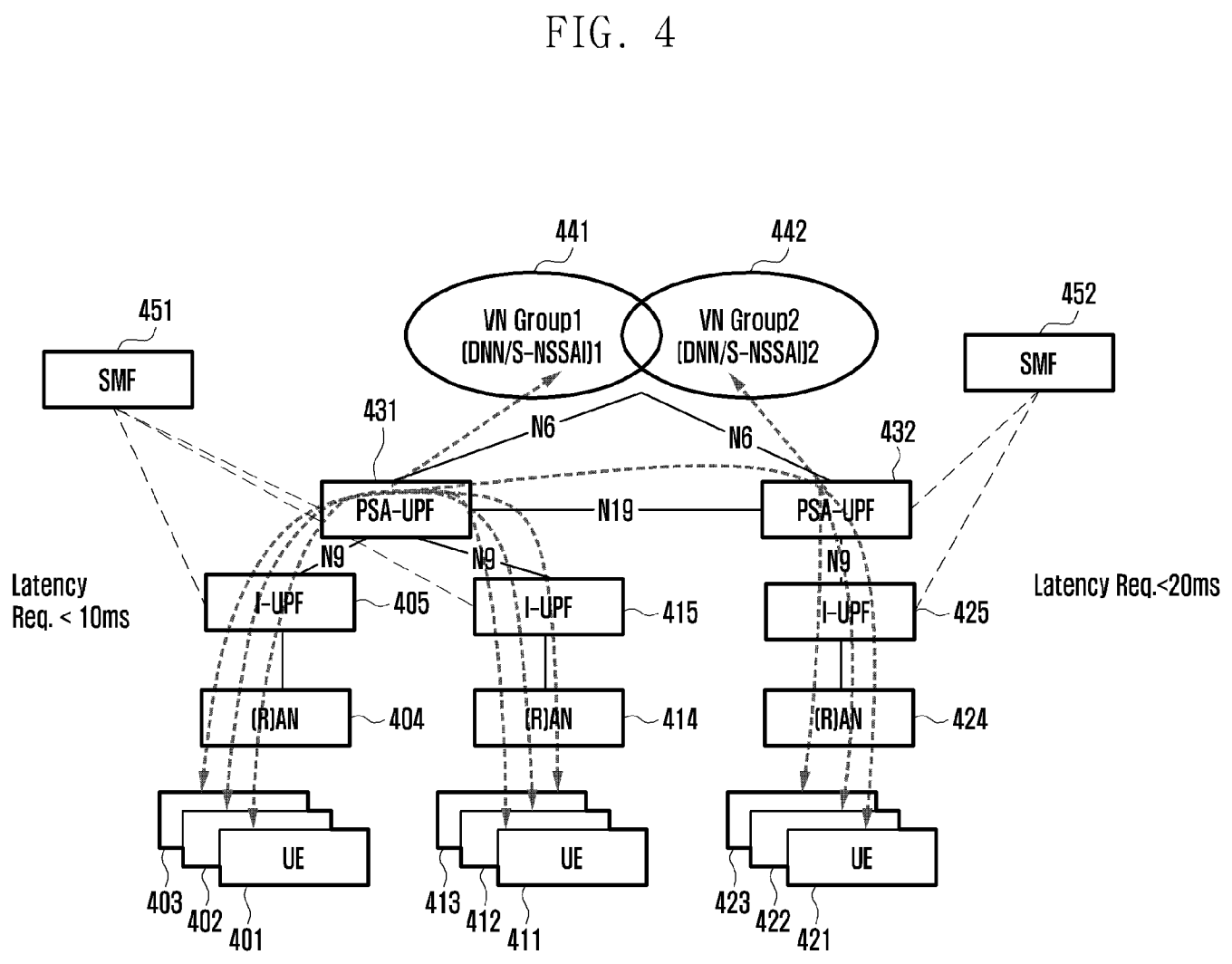

FIG. 4 illustrates a problem of 5G VN group communications when a plurality of SMFs are used according to an embodiment of the present disclosure.

FIG. 4 also uses reference numerals different from those of FIGS. 1 to 3 that have been described above. This is for ease of description, and a basic operation and/or basic function of each NF may be the same as described above.

Comparing the configuration of FIG. 4 and the configuration of FIG. 3, the difference therebetween may be as follows, except for having different reference numerals.

FIG. 3 illustrates the case in which all UPFs are connected to the single same SMF 351. However, in FIG. 4, a first PSA-UPF 431, which is connected to a first I-UPF 405, a second I-UPF 415, and a VN Group1 DN 441, is connected to a first SMF 451, and a second PSA-UPF 432, which is connected to a third I-UPF 425 and a VN Group2 DN 442, is connected to a second SMF 452. Other components are the same except for having different reference numerals, and thus a detailed description thereof will be omitted.

As shown in the configuration of FIG. 4, in case that each SMF is in charge of corresponding group, restriction of a service area is present, or an SMF is allocated for each TA, a plurality of SMFs may be needed. In this instance, a single SMF is restricted to being in charge of group communication of a single group. Therefore, all PSA UPFs may not be controlled to support communication of all UEs of 5G VN groups that support a plurality of groups. For example, configuring a data transfer path between the first PSA UPF 431 controlled by the first SMF 451 and the second PSA UPF 432 controlled by the second SMF 452 may be unavailable.

The disclosure may provide a method and apparatus for overcoming the above-described drawback.

Figure 5:
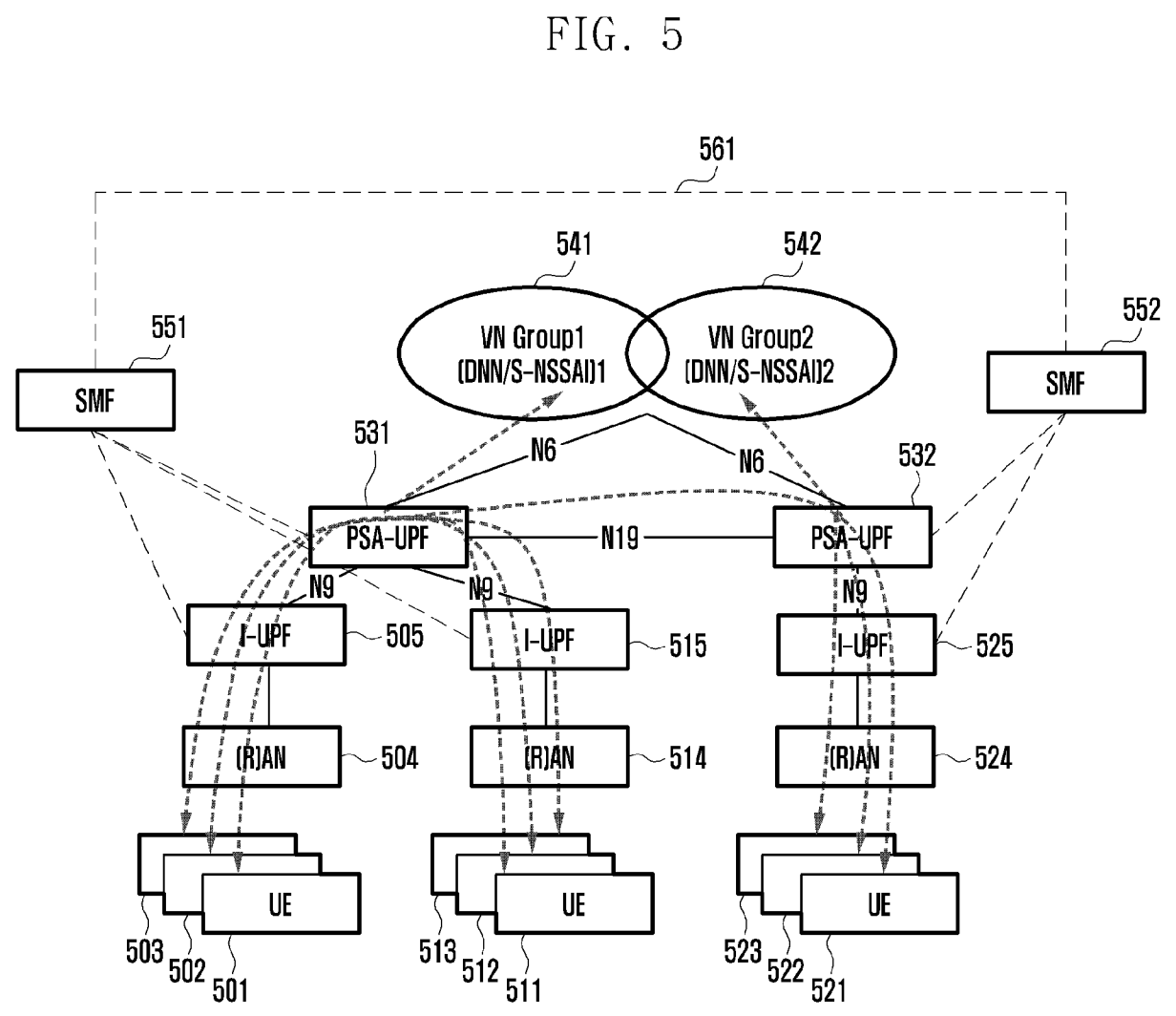

FIG. 5 illustrates a scheme of 5G VN group communications when a plurality of SMFs are used according to an embodiment of the present disclosure.

Comparing FIG. 4 and FIG. 5, FIG. 5 has the same conditions as the example that has been described with reference to FIG. 4. That is, FIG. 4 illustrates the case in which the first I-UPF 405 and the second I-UPF 415 are connected to the first PSA-UPF 431 that is connected to the VN Group1 DN 441, and the first PSA-UPF 431 is connected to the first SMF 451, and the third I-UPF 425 is connected to the second PSA-UPF 432 that is connected to the VN Group2 DN 442, and the second PSA-UPF 432 is connected to the second SMF 452

It is recognized that FIG. 5 has the same configuration. That is, a first PSA-UPF 531, which is connected to a first I-UPF 505, a second I-UPF 515, and a VN Group1 DN 541, is connected to a first SMF 551, and a second PSA-UPF 532, which is connected to a third I-UPF 525 and a VN Group2DN 542, is connected to a second SMF 552. Other components are the same as described with reference to FIGS. 3 and 4, except for having different reference numerals, and thus a detailed description thereof will be omitted.

In addition, the disclosure illustrates a connection line, for example, a connection line 561, between the first SMF 551 and the second SMF 552. As described above, in the disclosure, via the connection between the first SMF 551 and the second SMF 552, a plurality of SMFs may share all pieces of information in a group for group communications so as to control all PSA UPFs to support communication among all UEs in a single 5G VN group. For example, Sharing information among SMFs may enable configuration of a data transfer path between the first PSA UPF 531 controlled by the first SMF 551 and the second PSA UPF 532 controlled by the second SMF 552.

In order to support a PDU session that supports a plurality of groups, a UE may transmit a PDU session establish request by specifying a plurality of groups. For example, in order to simultaneously support two groups, that is, a first group (Group 1 (G1)) and a second group (Group 2 (G2)), a single UE may transfer, to an AMF (not illustrated in FIG. 5), a PDU session establish request including a first DNN/S-NSSAI corresponding to G1 and a second DNN/S-NSSAI corresponding to G2. The AMF may determine (or select) an SMF based on the information. The process in which the AMF determines (or selects) an SMF may include a process in which the AMF asks a network repository function (NRF) to perform selection. Based thereon, the AMF may select an SMF that is capable of simultaneously supporting G1 and G2. In case that it is not allowed, the AMF may select an SMF according to the following method.

Before describing an additional operation in which the AMF determines (or selects) an SMF, an NRF will be described briefly first. The NRF may support a service discovery function. The NRF may receive an NF discovery request from an NF instance, and may provide discovered NF instance information to the NF instance. In addition, the NRF may maintain available NF instances and services supported by them.

Now, the additional operation in which the AMF determines (or selects) an SMF will be described.

In one example, the AMF may select a single group based on a priority order of G1 and G2, may preferentially select an SMF that supports the selected group, and may transfer a PDU session establish request transmitted by a UE to the corresponding SMF. The priority order may be associated with a priority allocated for each QoS when an AF configures QoS for each group. That is, in case that QoS1 has a higher priority than QoS2 between QoS1 allocated to G1 and QoS2 allocated to G2, it is considered that G1 has a higher priority than G2. Alternatively, the priority order of G1 and G2 may be determined based on information that an operator configures in advance. As another example, in case that a UE specifies parameters of a DNN/S-NSSAI in order of G1 and G2 when transmitting a PDU session establish request, the priority order may be determined based on this order. That is, the priority order may be determined in order of groups arranged in the PDU session establish request transmitted by the UE. For example, in case that G1 is located before G2 in the PDU session establish request transmitted by the UE, it is determined that the priority of G1 arranged before G2 may have a higher priority than G2. In case that a single SMF is selected as a representative (prime) SMF, the AMF may transmit a PDU session setup request to the prime SMF. Accordingly, the representative SMF may select other SMFs.

For example, in case that G1 has a higher priority than G2, the first SMF 551 that is in charge of G1 may be selected as a representative SMF and may receive a PDU session setup request from the AMF. The first SMF 551 that receives the request may additionally select the second SMF 552 that is in charge of G2. The process of selecting an SMF may include a method of asking an NRF to perform selection. A term that indicates an SMF that performs functions of receiving a signaling from the AMF first and discovering the remaining SMFs may be various such as a representative SMF, a prime SMF, and the like the like.

In one example, the AMF may select the first SMF 551 that is in charge of G1 and the second SMF 552 that is in charge of G2, and may simultaneously transmit a PDU session establish request to the first SMF 551 and the second SMF 552. In this instance, each PDU session setup request may include a list of related SMFs so that each SMF 551 and 552 is capable of communicating with other SMFs. As described above, the configuration in which the first SMF 551 and the second SMF 552 mutually recognize and are capable of performing communication is indicated by reference numeral 561 (e.g., a connection line).

In one example, the AMF may transfer a PDU session establish request to the first SMF 551 that is in charge of G1 and may await progress, and, upon receiving a PDU session establish response, may transfer a PDU session establish request to the second SMF 552 that is in charge of G2. The AMF may include information of the first SMF 551 in the PDU session establish request when transferring the same to the second SMF 552. The second SMF 552 may proceed with establishment of a PDU session with reference to the information of the first SMF 551, and may communicate with the first SMF 551 when it is needed. Only after the second SMF 552 transfers a PDU session setup response (or PDU session establish response) to the AMF, may the AMF be capable of transferring the PDU session setup response to the UE.

Figure 6A:
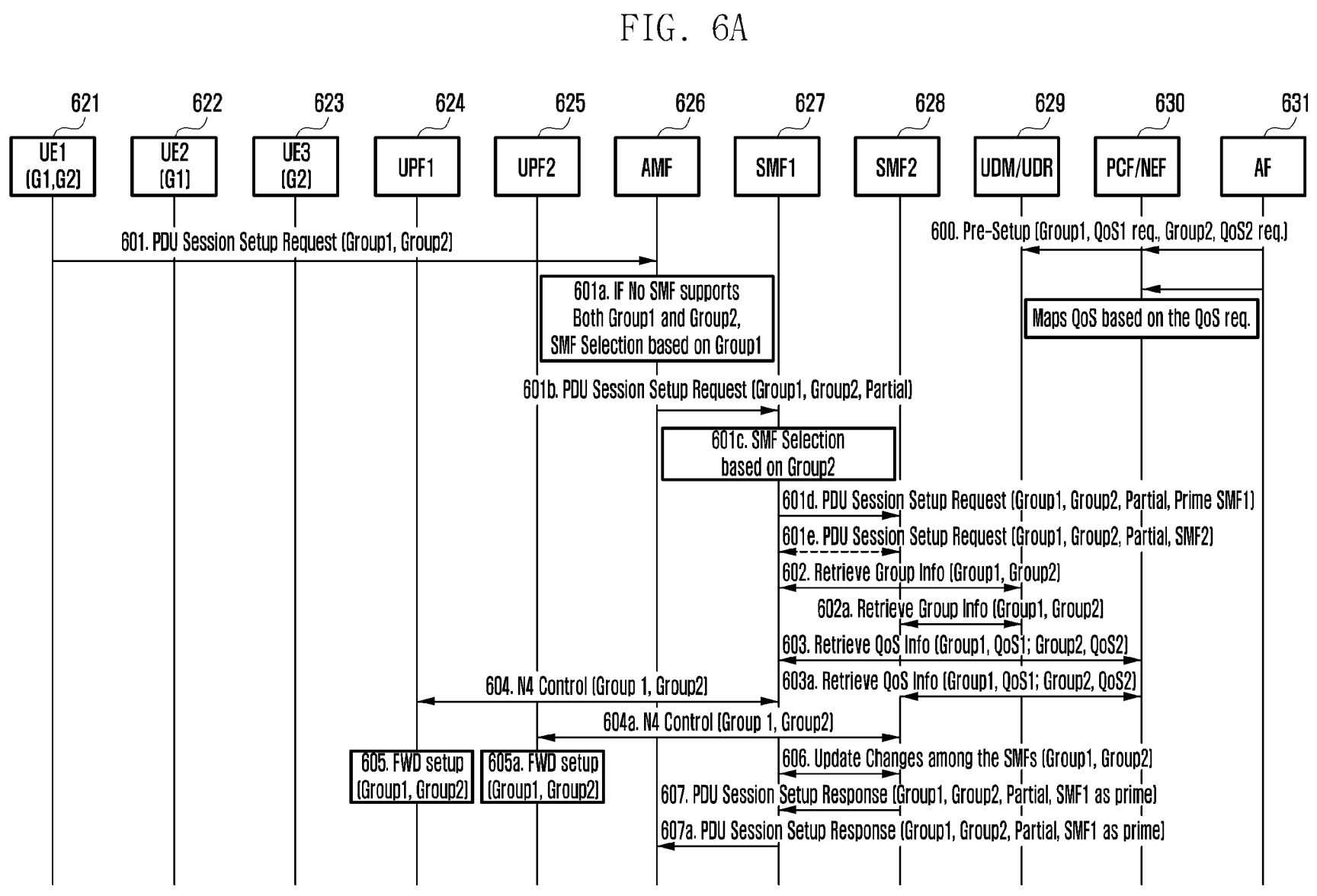
Figure 6B:
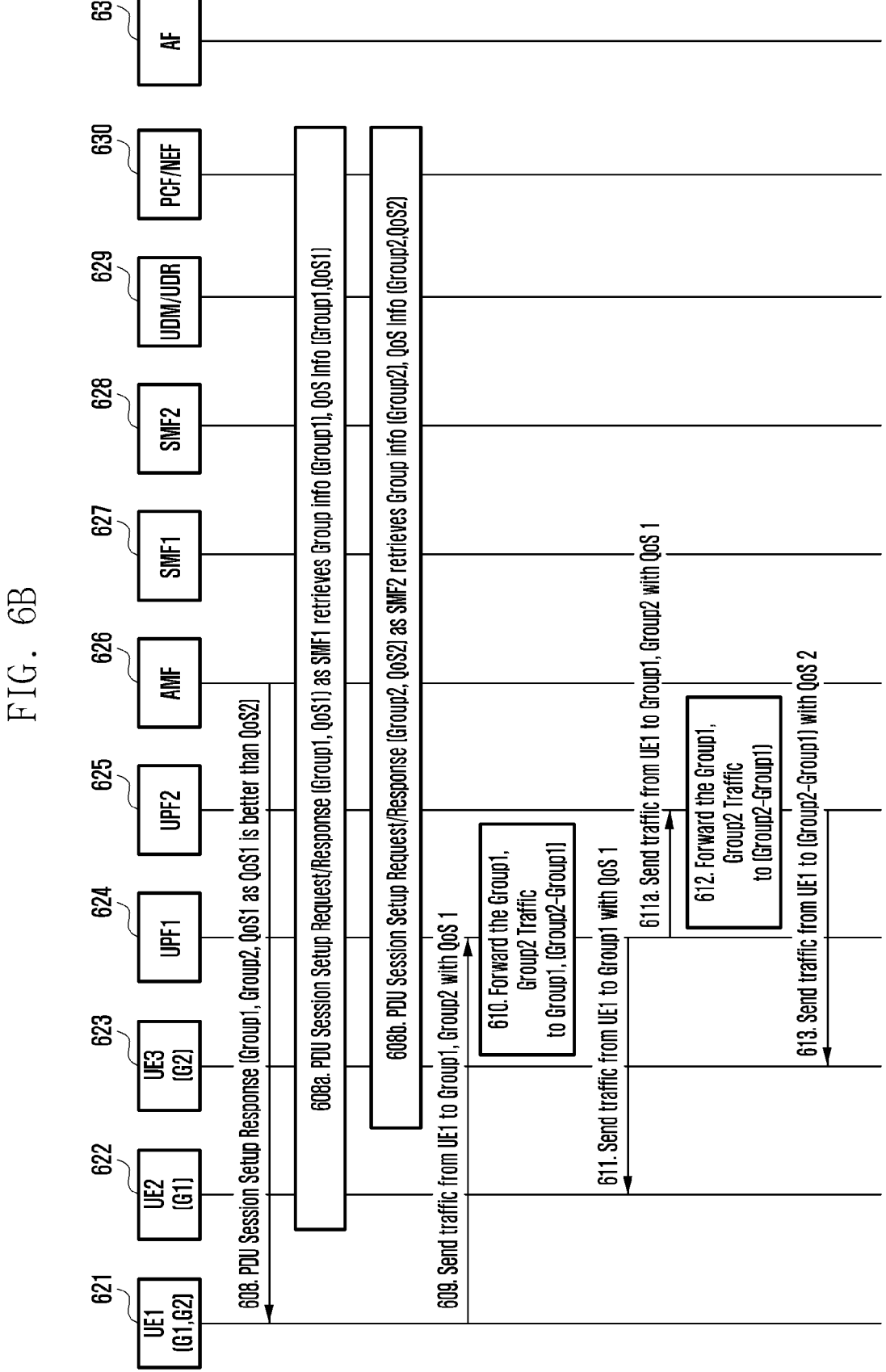
FIG. 6B illustrates a signal flowchart of establishing a PDU session that supports a plurality of groups by designating one of a plurality of SMFs as a representative SMF according to another embodiment of the present disclosure.

FIGS. 6A and 6B illustrate signal flowcharts of establishing a PDU session that supports a plurality of groups by designating one of a plurality of SMFs as a representative SMF according to an embodiment of the present disclosures.

FIGS. 6A and 6B may be diagrams for illustrating a single continuous flow. For example, basically, operation of FIG. 6B is continuously performed after operation of FIG. 6A is completed. In some cases, some of operation of FIG. 6A and/or some of operation of FIG. 6B may be omitted. In addition, some of the operation of FIGS. 6A and 6B may be performed in a different order.

First, component elements of FIGS. 6A and 6B will be described.

It is assumed that a first UE (UE1) 621 is a UE that belongs to both the first group (G1) and the second group (G2), a second UE (UE2) 622 is a UE that belongs to the first group (G1), and a third UE (UE3) 623 is a UE that belongs to the second group (G2). In addition, it is assumed that a first UPF (UPF1) 624 provides a service to G1 UE that supports QoS1, and a second UPF (UPF2) 625 provides a service to G2 UE that supports QoS2. In addition, the AMF 626 may manage access and mobility of UEs 621, 622, and 623. A first SMF (SMF1) 627 may be an SMF having a higher priority than a second SMF (SMF2) 628. A unified data management (UDM) 629 may store user subscription data, policy data, and the like. The UDM 629 may include two parts, that is, an application front end (FE) (not illustrated) and a user data repository (UDR). Hereinafter, a UDM/UDR will be described with reference to reference numeral 629 (e.g., UDR/UDM).

A network exposure function (NEF) may provide a unit for safely exposing, for example, services and capabilities for a 3rd party, an internal exposure/re-exposure, an application function, edge computing provided by 3GPP network functions. The NEF may receive information (information based on exposed capability (capabilities) of another NF (other NFs)) from another NF (other NFs). The NEF may store the received information as data structured using an interface standardized as a data storing network function. The stored information may be re-exposed to another NF (other NFs) and an AF (other AFs) by the NEF, and may be used for another purpose such as analysis or the like. In the disclosure provided below, a PCF/NEF will be described with reference to reference numeral 630 (e.g., PCF/NEF). An application function (AF) 631 that is a last component element may be a network entity that provides a predetermined service. The AF 631 may be included in a 3GPP network, or may be provided by a third party (3rd party). In case that it is provided by a 3rd party, an NEF is always necessary. Conversely, in case that an AF is provided by the same operator, that is, a 3GPP network operator, an NEF may be excluded.

Using the above-described component elements, operation according to the flowcharts of FIGS. 6A and 6B will be described.

In operation 600, an AF 631 configures group information for a UDR 629 via the NEF 630. In this instance, it is assumed that the form of a group that the AF 631 may provide is Group1 (G1) and Group2 (G2). Therefore, the AF 631 may configure G1 and G2 for the UDR 629. A QoS requirement may request configuration of QoS1 req and QoS2 req with respect to with respect to Group1 and Group2, respectively. In case that the QoS request is stored in the PCF 630, this may be mapped to a policy of a network and may be configured as policies of QoS1 and QoS2. The number of types of QoS requirements that the AF 631 requests may be different from the number of QoS policies that the PCF actually determines to support. That is, although QoS1 req and QoS2 req are different, QoS1 and QoS2 may be the same.

In operation 601, the UE1 621 that belongs to both Group1 and Group2 may transmit a PDU session setup request to the AMF 626 by simultaneously using a DNN corresponding to Group1 and a DNN corresponding to Group2.

In operation 601*a*, the AMF 626 that receives the request may select an SMF that supports all the plurality of DNNs. However, in case that such an SMF is incapable of being selected, an SMF may be selected based on a DNN having the highest priority. In this instance, the DNN having the highest priority may be configured in advance, the DNN having the highest QoS policy recognized by reading configured QoS information may be determined as the DNN having the highest priority, or the DNN having the highest priority may be determined based on an order of DNNs included in a PDU session establish request.

In operation 601*b*, the SMF1 627 is selected on the assumption that a DNN corresponding to Group1 has a priority in the embodiments of FIGS. 6A and 6B, and thus the AMF 626 may transfer a PDU session setup request to the selected SMF, that is, the SMF1 627. In this instance, processing of the PDU session may include a partial indication indicating that the SMF1 627 is capable of being in charge of only a part, as opposed to the whole.

In operation 601*c*, the SMF1 627 may select the SMF2 628 based on a DNN corresponding to Group2.

In operation 601*d*, the SMF1 627 may transfer a PDU session establish request to the SMF2 628. In this instance, a partial indication may be included, which indicates the SMF2 628 is capable of being in charge of only a part, as opposed to the whole of the corresponding PDU session. In addition, as a related SMF, it is specified that the SMF1 627 is operating as a representative SMF.

In operation 601*e*, the SMF2 628 may be an SMF that is in charge of a part of a PDU session, and may transfer a message indicating that requesting establishment of the remaining PDU session is to be performed using the SMF1 627 as a representative SMF.

In operation 602, the SMF may receive, from the UDR/ UDM 629, information associated with Group1 and Group2 that the UE subscribes based on DNNs included in the PDU session establish request. In the whole description of the disclosure, "an operation of receiving" may be an operation corresponding to request/response or may correspond to an operation corresponding to subscription/notify.

In operation 602*a*, the SMF2 628 may receive, from the UDR/UDM 629, information associated with Group1 and Group2 that the UE subscribes based on the DNNs included in the PDU session establish request.

Although operation is performed in order of operation 602 and operation 602*a* in FIG. 6A, the operations may be performed simultaneously or in a different order. For example, operation 602*a* may be performed before operation 602.

In operation 603, the SMF1 627 may receive, from the PCF 630, policies of QoS1 related to Group1 and QoS2 related to Group2.

In operation 603*a*, the SMF2 628 may receive, from the PCF 630, policies of QoS1 related to Group1 and QoS2 related to Group2.

In operation 604, the SMF1 627 may request, from the UPF1 624, traffic forwarding and QoS configuration related to Group1 and Group2.

In operation 604*a*, the SMF2 628 may request, from the UPF2 625, traffic forwarding and QoS configuration related to Group1 and Group2.

In operation 605, the UPF1 624 may configure a traffic forwarding path related to Group1 and Group2. The traffic forwarding path may be configured using a forwarding table. When configuring the forwarding table, the UPF1 624 may perform configuration so that forwarding associated with Group1 having high QoS has a higher priority than forwarding associated with Group2 having low QoS. A priority of forwarding for each group may be determined based on a QoS policy level mapped in operation 600, and thus forwarding may be configured to have the same priority when QoS1 and QoS2 respectively allocated to Group1 and Group2 are the same.

In operation 605*a*, the UPF2 625 may configure a traffic forwarding path related to Group1 and Group2. The traffic forwarding path configuration may be performed using a forwarding table, and the UPF2 625 may perform configuration so that forwarding associated with Group1 having high QoS has a higher priority than forwarding associated with Group2 having low QoS, when configuring a forwarding table. A priority of forwarding for each group may be determined based on a QoS policy level mapped in operation 600, and thus forwarding may be configured to have the same priority when QoS1 and QoS2 respectively allocated to Group1 and Group2 are the same.

In operation 606, the SMF1 627 and the SMF2 628 may communicate with each other and may configure forwarding information, changed by the current PDU session, for PSA UPFs that the SMF1 627 and the SMF2 628 are in charge of, respectively.

In operation 607, the SMF2 628 may transfer a PDU session establish response to the SMF1 627 that is a representative SMF.

In operation 607*a*, the SMF1 627 that is the representative SMF may transfer the PDU session establish response, which heads the UE1 621, to the AMF 626. In this instance, QoS1 having a higher value between QoS1 allocated to Group1 and QoS2 allocated to Group2 may be configured as QoS.

In operation 608, using the content received in operation 607*a*, the AMF 626 may transfer a PDU session establish response heading the UE1 621. In this instance, QoS1 having a higher value between QoS1 allocated to Group1 and QoS2 allocated to Group2 may be configured as QoS.

In operation 608*a*, the UE2 622 that only belongs to Group1 may transmit a PDU session establish request to the AMF 626 by using a DNN corresponding to Group1, when establishing a PDU session. The AMF 626 may select an SMF using the DNN corresponding to Group1. The AMF 626 may transfer a PDU session setup request to the selected SMF1 627. The SMF1 627 may receive, from the UDR/ UDM 629, information associated with Group1 to which the UE subscribes based on DNNs included in the PDU session establish request, and may receive a policy of QoS1 related to Group1 from the PCF 530. The SMF1 627 may request, from the UPF1 624, traffic forwarding and QoS configuration related to Group1. The UPF1 624 may configure a traffic forwarding path related to Group1 with QoS1. The SMF1 627 may transfer a PDU session establish response to the UE2 622, and may configure QoS1 allocated to Group1 as QoS.

In operation 608*b*, the UE3 623 that only belongs to Group2 may transmit a PDU session establish request to the AMF 626 by using a DNN corresponding to Group2, when establishing a PDU session. The AMF 626 may select an SMF using the DNN corresponding to Group2. The AMF 626 may transfer a PDU session setup request to the selected SMF2 628. The SMF2 628 may receive, from the UDR/ UDM 629, information associated with Group2 to which the UE subscribes based on the DNNs included in the PDU session establish request, and may receive a policy of QoS2 related to Group2 from the PCF 630. The SMF2 628 may request, from the UPF2 625, traffic forwarding and QoS configuration related to Group2. The UPF2 625 may configure a traffic forwarding path related to Group2 with QoS2. The SMF2 628 may transfer a PDU session establish response to the UE3 623, and may configure QoS2 allocated to Group2 as QoS.

In operation 609, the UE1 621 may transmit data, which heads Group1 and Group2, to the UPF1 624 with QoS1.

In operation 610, the UPF1 624 may transfer data, which heads from the UE1 621 to Group1 and Group2, to Group1 first. Subsequently, the UPF1 624 may transmit the data to a recipient that only belongs to Group2, as opposed to Group1.

In operation 611, the UPF1 624 may transfer the data, which heads from the UE1 621 to Group1 and Group2, to the UE2 622 that belongs to Group1 with QoS1.

In operation 611a, the UPF1 624 may transfer the data, which heads from the UE1 621 to Group1 and Group2, to the UPF2 625 that related to Group1 and Group2 with QoS1 which has a high value.

In operation 612, the UPF2 625 may transfer data, which heads from the UE1 621 to Group1 and Group2, to Group1 first. Subsequently, the UPF2 625 may transfer the same to Group2 that does not belong to Group1.

In operation 613, the UPF2 625 may transfer the data, which heads from the UE1 621 to Group1 and Group2, to the UE3 623 that belongs to Group2 with QoS2.

Figure 7A:
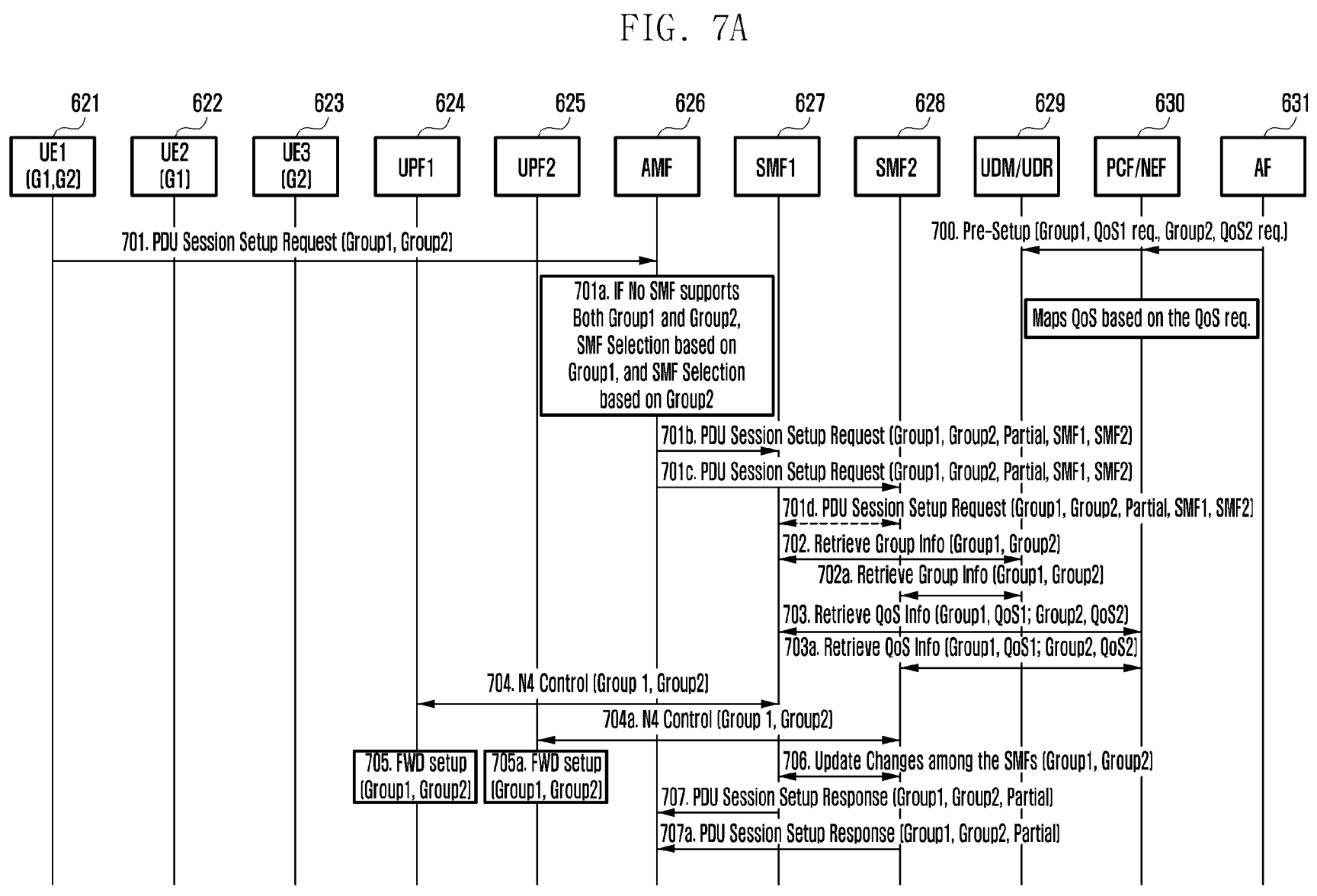

FIGS. 7A and 7B are signal flowcharts of establishing a PDU session that supports a plurality of groups by simultaneously performing signaling with respect to a plurality of SMFs according to another embodiment of the disclosure.

FIGS. 7A and 7B may be diagrams for illustrating a single continuous flow. For example, basically, operation of FIG. 7B is continuously performed after operation of FIG. 7A is completed. In some cases, some of operation of FIG. 7A and/or some of operation of FIG. 7B may be omitted. In addition, some of the operation of FIGS. 7A and 7B may be performed in a different order.

In addition, hereinafter, the reference numerals of the component elements in FIGS. 6A and 6B will be used as they are, for ease of description. Therefore, the basic operations of the above-described component elements may be the same as the description provided with reference to FIGS. 6A and 6B. An additional description will be provided with reference to a part that is different from the description of FIGS. 6A and 6B.

In operation 700, the AF 631 may configure group information for the UDR 629, via the NEF 630. In this instance, it is assumed that the form of a group that the AF 631 is capable of providing is Group1 and Group2. Therefore, the AF 631 may configure G1 and G2 for the UDR 629. A QoS requirement may request configuration of QoS1 req and QoS2 req with respect to Group1 and Group2, respectively. In case that the QoS request is stored in the PCF 630, this may be mapped to a policy of a network and may be configured as policies of QoS1 and QoS2. The number of types of QoS requirements that the AF 631 requests may be different from the number of QoS policies that the PCF 630 actually determines to support. That is, although QoS1 req and QoS req are different, QoS1 and QoS2 may be the same.

In operation 701, the UE1 621 that belongs to both Group1 and Group2 may transmit a PDU session setup request to the AMF 626 by simultaneously using a DNN corresponding to Group1 and a DNN corresponding to Group2.

In operation 701a, the AMF 626 that receives the request may select an SMF that supports all the plurality of DNNs. However, such an SMF is incapable of being selected, an SMF may be selected based on a DNN. The PDU session includes a plurality of DNNs, and thus a plurality of SMFs selected based on the corresponding DNNs may be selected. In the embodiment of the disclosure, the SMF1 627 is selected based on a DNN corresponding to Group1 and the SMF2 628 is selected based on a DNN corresponding to Group2.

In operation 701b, the AMF 626 may transfer a PDU session setup request to the selected SMF1 627. In this instance, processing of the PDU session may include a partial indication indicating that the SMF1 627 is capable of being in charge of only a part, as opposed to the whole. In addition, a list of all SMFs involved in the PDU session, that is, the SMF1 627 and the SMF2 628, may be included. In this instance, the role of a representative SMF may be specified. For example, the SMF1 627 may be specified as a representative SMF.

In operation 701c, the AMF 626 may transfer a PDU session setup request to the selected SMF2 628. In this instance, processing of the PDU session may include a partial indication indicating that the SMF2 628 is capable of being in charge of only a part, as opposed to the whole. In addition, a list of all SMFs involved in the PDU session, that is, the SMF1 627 and SMF2 628, may be included. In this instance, the role of a representative SMF may be specified. For example, the SMF1 627 may be specified as a representative SMF.

In operation 701d, the SMF1 627 and the SMF2 628 are SMFs that are partially in charge of a PDU session, and may transfer, to each other, a message indicating that requesting establishment of a PDU session is to be performed. In this instance, the role of a representative SMF may be specified. For example, the SMF1 627 may be specified as a representative SMF.

In operation 702, the SMF1 627 that is a representative SMF may receive, from the UDR/UDM 629, information associated with Group1 and Group2 that the UE1 621 subscribes based on DNNs included in the PDU session establish request.

In operation 702a, the SMF1 627 may receive, from the UDR/UDM 629, information associated with Group1 and Group2 that the UE1 621 subscribes based on the DNNs included in the PDU session establish request.

In operation 703, the SMF1 627 that is the representative SMF may receive, from the PCF 630, policies of QoS1 related to Group1 and QoS2 related to Group2.

In operation 703a, the SMF2 628 may receive, from the PCF 630, policies of QoS1 related to Group1 and QoS2 related to Group2.

In operation 704, the SMF1 627 may request, from the UPF1 624, traffic forwarding and QoS configuration related to Group1 and Group2.

In operation 704a, the SMF2 628 may request, from the UPF2 625, traffic forwarding and QoS configuration related to Group1 and Group2.

The above-described operations 702 and 702a may be performed at the same time, or may be performed in the reverse order of the order of FIG. 7A. The above-described operations 703 and 703a may be performed at the same time, or may be performed in the reverse order of the order of FIG. 7A. The above-described operations 702 and 702a may be performed at the same time, or may be performed in the reverse order of the order of FIG. 7A.

In operation 705, the UPF1 624 may configure a traffic forwarding path related to Group1 and Group2. The traffic forwarding path configuration may be performed using a forwarding table. When configuring the forwarding table, the UPF1 624 may perform configuration so that forwarding associated with Group1 having high QoS has a higher priority than forwarding associated with Group2 having low QoS. A priority of forwarding for each group may be determined based on a QoS policy level mapped in operation 600, and thus forwarding may be configured to have the same priority when QoS1 and QoS2 respectively allocated to Group1 and Group2 are the same.

In operation 705a, the UPF2 625 may configure a traffic forwarding path related to Group1 and Group2. The traffic forwarding path configuration may be performed using a forwarding table, and the UPF2 625 may perform configuration so that forwarding associated with Group1 having high QoS has a higher priority than forwarding associated with Group2 having low QoS, when configuring a forwarding table. A priority of forwarding for each group may be determined based on a QoS policy level mapped in operation 600, and thus forwarding may be configured to have the same priority when QoS1 and QoS2 respectively allocated to Group1 and Group2 are the same.

In operation 706, the SMF1 627 and the SMF2 628 may communicate with each other and may configure forwarding information, changed by the current PDU session, for PSA UPFs that the SMF1 627 and the SMF2 628 are in charge of, respectively.

In operation 707, the SMF1 627 may transfer a PDU session establish response to the AMF 626.

In operation 707a, the SMF2 628 may transfer a PDU session establish response to the AMF 626.

Here, operation 707 and operation 707a may be performed at the same time, or operation 707a may be performed before operation 707.

In case that the role of a representative SMF is indicated in operation 701b, 701c, or 701d, the SMF2 628 may transfer a PDU session establish response to the SMF1 627 that is the representative SMF in operation 707b.

In case that the role of a representative SMF is indicated in operation 701b, 701c, or 701d, the SMF1 627 that is the representative SMF may transfer a PDU session establish response, which heads to the UE1 621, to the AMF 626 in operation 707c. In this instance, QoS1 having a higher value between QoS1 allocated to Group1 and QoS2 allocated to Group2 may be configured as QoS.

In operation 708, by using all the content received in operations 707 and 707a, the AMF 626 may transfer a PDU session establish response heading the UE1 621. In this instance, QoS1 having a higher value between QoS1 allocated to Group1 and QoS2 allocated to Group2 may be configured as QoS. In case that the role of a representative SMF is indicated in operation 701b or 701d, the AMF 626 may transfer a PDU session establish response, which heads the UE1 621, by using the content received in operation 707c. In this instance, QoS1 having a higher value between QoS1 allocated to Group1 and QoS2 allocated to Group2 may be configured as QoS.

In operation 708a, the UE2 622 that only belongs to Group1 may transmit a PDU session establish request to the AMF 626 by using a DNN corresponding to Group1, when establishing a PDU session. The AMF 626 may select an SMF using the DNN corresponding to Group1. The AMF 626 may transfer a PDU session setup request to the selected SMF1 627. The SMF1 627 may receive, from the UDR/ UDM 629, information associated with Group1 to which the UE2 622 subscribes based on DNNs transmitted by being included in a PDU session establish request, and may receive a policy of QoS1 related to Group1 from the PCF 630. The SMF1 627 may request, from the UPF1 624, traffic forwarding and QoS configuration related to Group1. The UPF1 624 may configure a traffic forwarding path related to Group1 with QoS1. The SMF1 627 may transfer a PDU session establish response to the UE2 622, and may configure QoS1 allocated to Group1 as QoS.

In operation 708b, the UE3 623 that only belongs to Group2 may transmit a PDU session establish request to the AMF 626 by using a DNN corresponding to Group2, when establishing a PDU session. The AMF 626 may select an SMF using the DNN corresponding to Group2. The AMF 626 may transfer a PDU session setup request to the selected SMF2 628. The SMF2 628 may receive, from the UDR/ UDM 629, information associated with Group2 to which the UE subscribes based on DNNs included in the PDU session establish request, and may receive a policy of QoS2 related to Group2 from the PCF 630. The SMF2 628 may request, from the UPF2 625, traffic forwarding and QoS configuration related to Group2. The UPF2 625 may configure a traffic forwarding path related to Group2 as QoS2. The SMF2 628 may transfer a PDU session establish response to the UE3 623, and may configure QoS2 allocated to Group2 as QoS.

In operation 709, the UE1 621 may transmit data, which heads Group1 and Group2, to the UPF1 624 with QoS1.

In operation 710, the UPF1 624 may transfer data, which heads from the UE1 621 to Group1 and Group2, to Group1 first. Subsequently, the UPF1 624 may also transmit data to a recipient that only belongs to Group2, as opposed to Group1.

In operation 711, the UPF1 624 may transfer data, which heads from the UE1 621 to Group1 and Group2, to UE2 622 that belongs to Group1 with QoS1.

In operation 711a, the UPF1 624 may transfer data, which heads from the UE1 621 to Group1 and Group2, to the UPF2 625 that related to Group1 and Group2 with QoS1 which is high.

In operation 712, the UPF2 625 may transfer data, which heads from the UE1 621 to Group1 and Group2, to Group1 first. Subsequently, the UPF2 625 may transfer the same to Group2 that does not belong to Group1.

In operation 713, the UPF2 625 may transfer data, which heads from the UE1 621 to Group1 and Group2, to the UE3 623 that belongs to Group2 with QoS2.

Figure 8A:
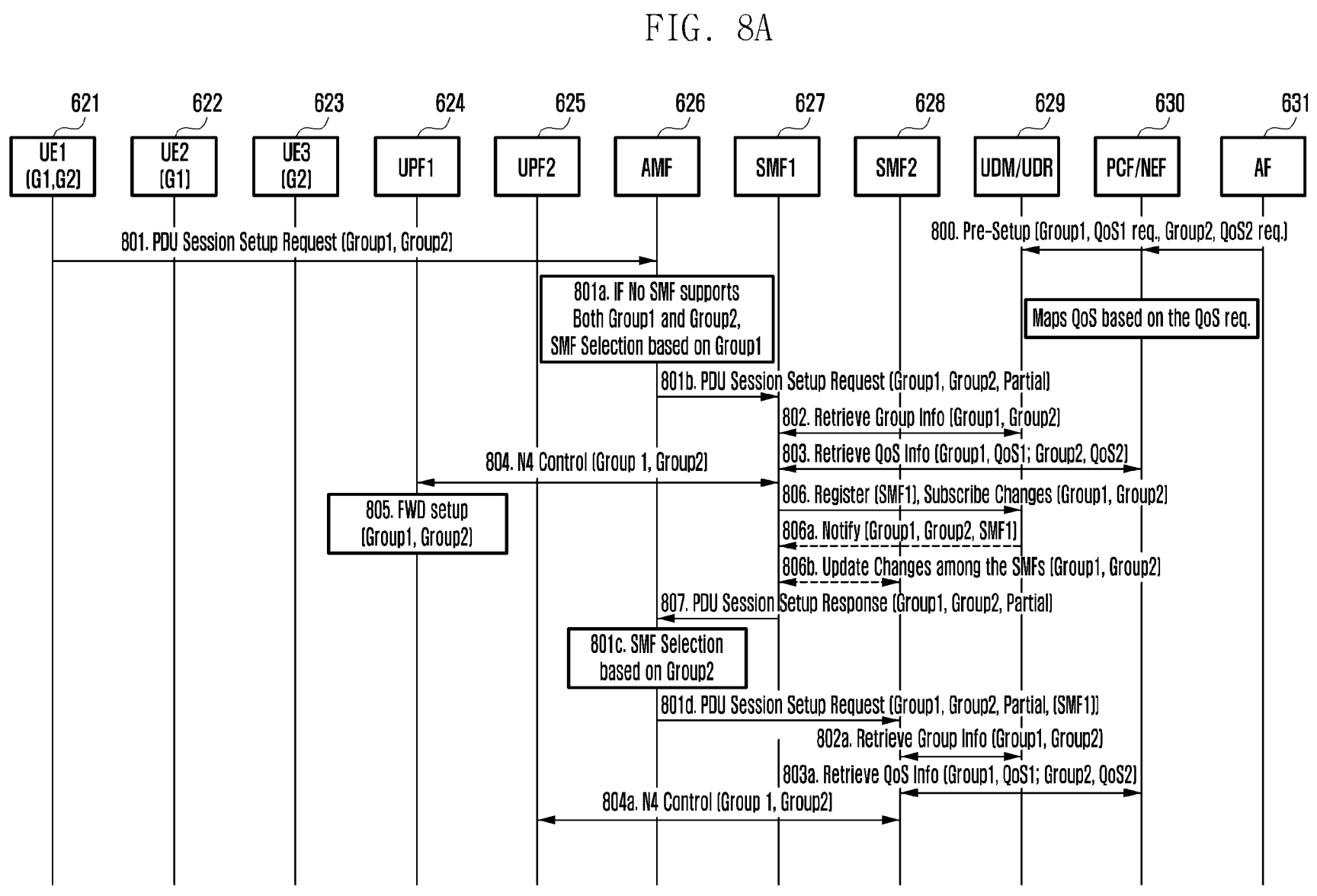
Figure 8B:
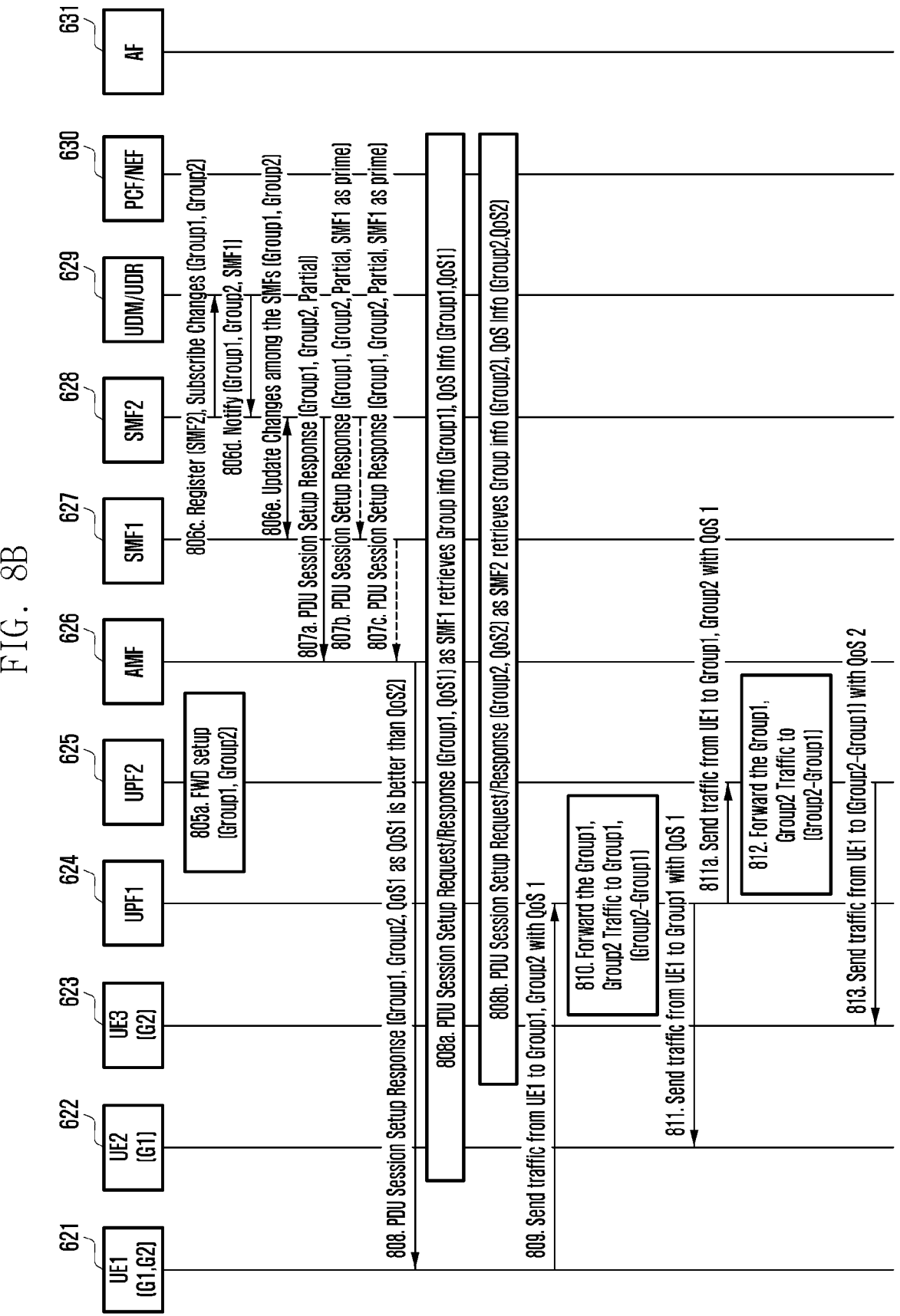
FIG. 8B illustrates a signal flowchart of establishing a PDU session that supports a plurality of groups by sequentially performing signaling with respect to a plurality of SMFs according to another embodiment of the present disclosure.

FIGS. 8A and 8B are signal flowcharts of establishing a PDU session that supports a plurality of groups by sequentially performing signaling with respect to a plurality of SMFs according to another embodiment of the disclosure.

FIGS. 8A and 8B may be diagrams for illustrating a single continuous flow. For example, basically, operation of FIG. 8B is continuously performed after operation of FIG. 8A is completed. In some cases, some of operation of FIG. 8A and/or some of operation of FIG. 8B may be omitted. In addition, some of the operation of FIGS. 8A and 8B may be performed in a different order.

In addition, hereinafter, the reference numerals of the component elements in FIGS. 6A and 6B will be used as they are, for ease of description. Therefore, the basic operations of the above-described component elements may be the same as the description provided with reference to FIGS. 6A and 6B. An additional description will be provided with reference to a part that is different from the description of FIGS. 6A and 6B.

In operation 800, the AF 631 may configure group information for the UDR 629 via the NEF 630. In this instance, it is assumed that the form of a group that the AF 631 may provide is Group1 (G1) and Group2 (G2). Therefore, the AF 631 may configure G1 and G2 for the UDR 629. A QoS requirement may request configuration of QoS1 req and QoS2 req with respect to Group1 and Group2, respectively. In case that the QoS request is stored in the PCF 630, this may be mapped to a policy of a network and may be configured as policies of QoS1 and QoS2. The number of types of QoS requirements that the AF 631 requests may be different from the number of QoS policies that the PCF actually determines to support. That is, although QoS1 req and QoS req are different, QoS1 and QoS2 may be the same.

In operation 801, the UE 621 that belongs to both Group1 and Group2 may transmit a PDU session setup request to the AMF 626 by simultaneously using a DNN corresponding to Group1 and a DNN corresponding to Group2.

In operation 801*a*, the AMF 626 that receives the request may select an SMF that supports all the plurality of DNNs. However, such an SMF is incapable of being selected, an SMF may be selected based on a DNN. The PDU session includes a plurality of DNNs, and thus a plurality of SMFs selected based on the corresponding DNNs may be selected. In the embodiment of the disclosure, the SMF1 627 is selected based on a DNN corresponding to Group1 and the SMF2 628 is selected based on a DNN corresponding to Group2.

In operation 801*b*, the AMF 626 may transfer the PDU session setup request to the selected SMF1 627. In this instance, processing of the PDU session may include a partial indication indicating that the SMF1 627 is capable of being in charge of only a part, as opposed to the whole. In addition, a list of all SMFs involved in the PDU session, that is, the SMF1 627 and the SMF2 628, may be included. In this instance, the role of a representative SMF may be specified. For example, the SMF1 627 may be specified as a representative SMF.

In operation 802, the SMF1 627 may receive, from the UDR/UDM 629, information associated with Group1 and Group2 that the UE1 621 subscribes based on DNNs included in the PDU session establish request transmitted.

In operation 803, the SMF1 627 may receive, from the PCF 630, policies of QoS1 related to Group1 and QoS2 related to Group2.

In operation 804, the SMF1 627 may request, from the UPF1 624, traffic forwarding and QoS configuration related to Group1 and Group2.

In operation 805, the UPF1 624 may configure a traffic forwarding path related to Group1 and Group2. The traffic forwarding path configuration may be performed using a forwarding table. When configuring the forwarding table, the UPF1 624 may perform configuration so that forwarding associated with Group1 having high QoS has a higher priority than forwarding associated with Group2 having low QoS. A priority of forwarding for each group may be determined based on a QoS policy level mapped in operation 600, and thus forwarding may be configured to have the same priority when QoS1 and QoS2 respectively allocated to Group1 and Group2 are the same.

In operation 806, the SMF1 627 may register, with the UDM 629, the fact that the SMF1 627 joins a PDU session associated with Group1 and Group2. In addition, reporting of related SMFs may be requested.

In operation 806*a*, the UDM 629 may report a list of SMFs that join the SMF1 627. In the embodiment, only the current SMF1 627 is registered, and thus information separately reported may not be present. In case that order of operation 801*a* and operation 801*c* to be described later is changed, in this instance, a notification indicating that the SMF2 628 is registered may be received.

In operation 806*b*, the SMFs that join may communicate with each other and may configure forwarding information, changed by the current PDU session, for PSA UPFs that the corresponding SMFs are in charge of, respectively. In the embodiment, it is the state in which the SMF1 627 only joins, and thus the above-described process may be omitted. In case that order of operation 801*a* and operation 801*c* to be described later is changed, the SMF1 627 and the SMF2 628 may communicate with each other and may configure forwarding information, changed by the current PDU session, for PSA UPFs that the SMF1 627 and the SMF2 628 are in charge of, respectively.

In operation 807, the SMF1 627 may transfer a PDU session establish response to the AMF 626.

In operation 801*c*, the AMF 626 may transfer a PDU session setup request to the selected SMF2 628. In this instance, processing of the PDU session may include a partial indication indicating that the SMF2 628 is capable of being in charge of only a part, as opposed to the whole. In addition, a list of all SMFs involved in the PDU session, that is, the SMF1 627 and SMF2 628, may be included. In this instance, the role of a representative SMF may be specified. For example, the SMF1 627 may be specified as a representative SMF.

In operation 801*d*, the SMF1 627 and the SMF2 628 are SMFs that are partially in charge of PDU session, and may transfer, to each other, a message indicating that requesting establishment of a PDU session is to be performed. In this instance, the role of a representative SMF may be specified. For example, the SMF1 627 may be specified as a representative SMF.

In operation 802*a*, the SMF2 628 may receive, from the UDR/UDM 629, information associated with Group1 and Group2 that the UE subscribes based on DNNs included in the PDU session establish request.

In operation 803*a*, the SMF2 628 may receive, from the PCF 630, policies of QoS1 related to Group1 and QoS2 related to Group2.

In operation 804*a*, the SMF2 628 may request, from the UPF2 625, traffic forwarding and QoS configuration related to Group1 and Group2.

In operation 805*a*, the UPF2 625 may configure a traffic forwarding path related to Group1 and Group2. The traffic forwarding path configuration may be performed using a forwarding table. When configuring the forwarding table, the UPF2 625 may perform configuration so that forwarding associated with Group1 having high QoS has a higher priority than forwarding associated with Group2 having low QoS. A priority of forwarding for each group may be determined based on a QoS policy level mapped in operation 800, and thus forwarding may be configured to have the same priority when QoS1 and QoS2 respectively allocated to Group1 and Group2 are the same.

In operation 806*c*, the SMF2 628 may register, with the UDM 629, the fact that the SMF2 628 joins a PDU session associated with Group1 and Group2. In addition, reporting of related SMFs may be requested.

In operation 806*d*, the UDM 629 may report a list of SMFs that join the SMF2 628. In the embodiment, the current SMF1 627 is only registered, and thus a notification indicating that the SMF1 627 is registered may be received.

In operation 806*e*, the SMFs may communicate with each other and may configure forwarding information, changed by the current PDU session, for PSA UPFs that the corresponding SMFs are in charge of, respectively. In this state, the SMF1 627 and the SMF2 628 may communicate with each other and may configure forwarding information, changed by the current PDU session, for PSA UPFs that the SMF1 627 and the SMF2 628 are in charge of, respectively.

In operation 807*a*, the SMF2 628 may transfer a PDU session establish response to the AMF 626.

In case that the role of a representative SMF is indicated in operation 801*b* or 801*d*, the SMF2 628 may transfer a PDU session establish response to the SMF1 627 that is the representative SMF in operation 807*b*.

In case that the role of a representative SMF is indicated in operation 801*b* or 801*d*, the SMF1 627 that is the representative SMF may transfer a PDU session establish response, which heads to the UE1 621, to the AMF 626 in operation 807*c*. In this instance, QoS1 having a higher value between QoS1 allocated to Group1 and QoS2 allocated to Group2 may be configured as QoS.

In operation 808, by using all the content received in operations 807 and 807*a*, the AMF 626 may transfer a PDU session establish response heading UE1 621. In this instance, QoS1 having a higher value between QoS1 allocated to Group1 and QoS2 allocated to Group2 may be configured as QoS. In case that the role of a representative SMF is indicated in operation 801*b* or 801*d*, the AMF 626 may transfer a PDU session establish response, which heads the UE1 621, by using the content received in operation 807*c*. In this instance, QoS1 having a higher value between QoS1 allocated to Group1 and QoS2 allocated to Group2 may be configured as QoS.

In operation 808*a*, the UE2 622 that only belongs to Group1 may transmit a PDU session establish request to the AMF 626 by using a DNN corresponding to Group1, when establishing a PDU session. The AMF 626 may select an SMF using a DNN corresponding to Group1. The AMF 626 may transfer a PDU session setup request to the selected SMF1 627. The SMF1 627 may receive, from the UDR/UDM 629, information associated with Group1 to which the UE2 622 subscribes based on DNNs included in the PDU session establish request, and may receive a policy of QoS1 related to Group1 from the PCF 630. The SMF1 627 may request, from the UPF1 624, traffic forwarding and QoS configuration related to Group1. The UPF1 624 may configure a traffic forwarding path related to Group1 with QoS1. The SMF1 627 may transfer a PDU session establish response to the UE2 622, and may configure QoS1 allocated to Group1 as QoS.

In operation 808*b*, the UE3 623 that only belongs to Group2 may transmit a PDU session establish request to the AMF 626 by using a DNN corresponding to Group2, when establishing a PDU session. The AMF 626 may select an SMF using the DNN corresponding to Group2. The AMF 626 may transfer the PDU session setup request to the selected SMF2 628. The SMF2 628 may receive, from the UDR/UDM 629, information associated with Group2 to which the UE subscribes based on DNNs included in the PDU session establish request, and may receive a policy of QoS2 related to Group2 from the PCF 630. The SMF2 628 may request, from the UPF2 625, traffic forwarding and QoS configuration related to Group2. The UPF2 625 may configure a traffic forwarding path related to Group2 with QoS2. The SMF2 628 may transfer a PDU session establish response to the UE3 623, and may configure QoS2 allocated to Group2 as QoS.

In operation 809, the UE1 621 may transmit data, which heads Group1 and Group2, to the UPF1 624 with QoS1.

In operation 810, the UPF1 624 may transfer data, which heads from the UE1 621 to Group1 and Group2, to Group1 first. Subsequently, the UPF1 624 may transmit the data to a recipient that only belongs to Group2, as opposed to Group1.

In operation 811, the UPF1 624 may transfer data, which heads from UE1 621 to Group1 and Group2, to UE2 622 that belongs to Group1 with QoS1.

In operation 811*a*, the UPF1 624 may transfer data, which heads from the UE1 621 to Group1 and Group2, to the UPF2 625 that related to Group1 and Group2 with QoS1 which is high.

In operation 812, the UPF2 625 may determine to transfer data, which heads from the UE1 621 to Group1 and Group2, to Group1 first. Subsequently, the UPF2 625 may determine to transfer the same to Group2 that does not belong to Group1.

In operation 813, the UPF2 625 may transfer data, which heads from UE1 621 to Group1 and Group2, to the UE3 623 that belongs to Group2 with QoS2.

Figure 9:
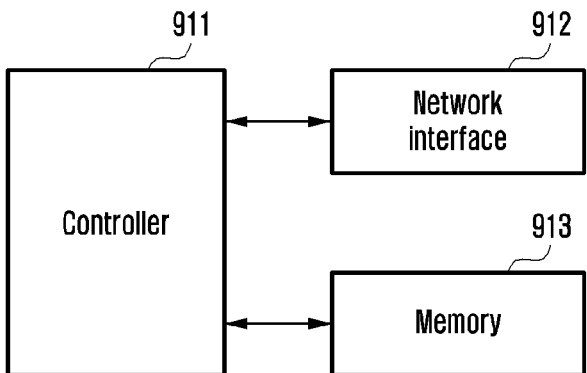
FIG. 9 illustrates a diagram illustrating a configuration of a user equipment (UE) according to an embodiment of the present disclosure.

FIG. 9 illustrates a configuration of a UE according to an embodiment of the present disclosure.

As illustrated in FIG. 9, a UE of the disclosure may include a network interface 912 (e.g., a transceiver including a transmitter and a receiver)), a memory 913, and a controller 911. According to the communication method of a UE that has been described with reference to FIGS. 1 to 8, the controller 911, the network interface 912, and the memory 913 of the UE may operate. In this instance, the component elements of the UE may not be limited only to the component elements illustrated in FIG. 9. For example, the UE may include more or fewer component elements than the above-described component elements illustrated in FIG. 9. In addition, the controller 911, the network interface 912, and the memory 913 may be embodied in the form of a single chip.

The network interface 912 is commonly known as a receiver and a transmitter for wireless communication of a UE, and may perform signal transmission or reception with a base station or a network entity. The signal transmitted or received by the base station may include control information and data. To this end, the network interface 912 may include an RF transmitter that up-converts and amplifies the frequency of a transmitted signal, an RF receiver that low-noise amplifies a received signal and down-converts the frequency of the signal, and the like. This is merely an example of the network interface 912, and the component elements of the network interface 912 are not limited to an RF transmitter and an RF receiver.

In addition, the network interface 912 may include a wired and wireless transceiver, and may include various configurations for transmitting and receiving a signal. In addition, the network interface 912 may receive a signal via a wireless channel and output the same to the controller 911, and may transmit a signal output from the controller 911 via a wireless channel. The network interface 912 may receive a communication signal and output the same to the controller 911, and may transmit a signal output from the controller 911 to a network entity via a wired or wireless network.

The memory 913 may store a program and data needed for operation of the UE. In addition, the memory 913 may store control information or data included in a signal (or a message) obtained by the UE. The memory 913 may be configured as a storage medium such as ROM, RAM, hard disk, CD-ROM, DVD, and the like, or a combination of storage media.

The controller 911 may control a series of processes for operation of the UE according to the embodiments described with reference to FIGS. 1 to 8. The controller 911 may include at least one processor. For example, the controller 911 may include a communication processor (CP) that performs control such as modulation/demodulation and encoding/decoding of a signal/message/data needed for communication, or the like, and an application processor (AP) that processes (or controls) the data/signal/message processed in the CP, in a higher layer such as an application program or the like.

In addition, the UE may include an input device/output device for interfacing a user, and may include a device, such as a speaker, a microphone, or the like, for processing a voice call via a VoNR and an existing wireless network. The input device may include, for example, at least one of a touch screen, a touch pad, a stylus, a key, a voice recognition device, and a gesture recognition device. The output device may include, for example, at least one of a display, a vibration motor, a speaker, and a lamp.

Figure 10:
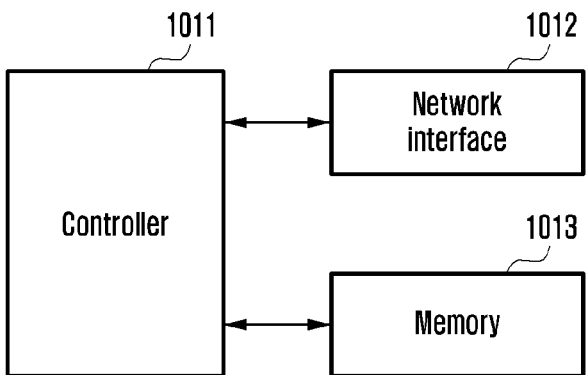
FIG. 10 illustrates a diagram illustrating a configuration of a network function according to an embodiment of the present disclosure.

FIG. 10 illustrates a configuration of a network function according to an embodiment of the present disclosure.

A network entity illustrated in FIG. 10 may be at least one of network functions (NFs). Referring to FIG. 10, the configuration of the network entity may include a controller 1011, a network interface 1012, and a memory 1013. The network entity according to the disclosure may be at least one of NFs described in FIGS. 1 to 8.

In addition, the component elements of an NF may not be limited only to the component elements illustrated in FIG. 10. For example, the NF may include more or fewer component elements than the above-described component elements. In addition, the controller 1011, the network interface 1012, and the memory 1013 may be embodied in the form of a single chip, or may be embodied in the form of an instance in a predetermined server. The NF may be one of a RAN, an AMF, an SMF, a PCF, a UDM/UDR, a UPF, and an NEF.

The network interface 1012 may be commonly known as a receiver and a transmitter of the NF, and may perform signal transmission or reception with the UE 101 or another NF. In this instance, the signal/message transmitted or received may include control information and data. In case that an NF is, for example, a base station, the network interface 1012 may include an RF transmitter that up-converts and amplifies the frequency of a transmitted signal, an RF receiver that low-noise amplifies a received signal and down-converts the frequency of the signal, and the like. This is merely an example of the network interface 1012, and the component elements of the network interface 1012 are not limited to an RF transmitter and an RF receiver. In addition, in case that the NF is an AMF, the network interface 1012 may be a device to provide interfacing another NF.

The memory 1013 may store a program and data needed for operation of the NF. In addition, the memory 1013 may store control information or data included in a signal obtained by the NF. The memory 1013 may be configured as a storage medium such as ROM, RAM, hard disk, CD-ROM, DVD, and the like, or a combination of storage media.

The controller 1011 may control a series of processes such that the NF operates according to the above-described embodiments of the disclosure. The controller 1011 may include at least one processor.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of an access and mobility management function (AMF) in a wireless communication system, the method comprising:

receiving, from a user equipment (UE), protocol data unit (PDU) session establish request information for supporting a plurality of groups;

transmitting a first PDU session establish request message to a selected first session management function (SMF) and a second PDU session establish request message to a selected second SMF, respectively; and receiving, from the first SMF, a first PDU session establish response message, wherein the first SMF that matches a first group is selected among the plurality of groups and the second SMF that matches a second group is selected among the plurality of groups, respectively, based on the received PDU session establish request information, wherein the first PDU session establish request message comprises information associated with the first group and the second group among the PDU session establish request information for supporting the plurality of groups, and wherein the second PDU session establish request message comprises information associated with the first group and the second group among the PDU session establish request information for supporting the plurality of groups.

2. The method of claim 1, wherein a first quality of service (QoS) is configured for the first group and a second QoS is configured for the second group.

3. The method of claim 1, wherein the first PDU session establish request message further comprises first partial indication information indicating that the first SMF controls the first group, and wherein the second PDU session establish request message further comprises second partial indication information indicating that the second SMF controls the second group.

4. The method of claim 3, wherein the first PDU session establish request message further comprises an SMF list, wherein the second PDU session establish request message further comprises the SMF list, and wherein the SMF list comprises information associated with the first SMF and information associated with the second SMF.

5. The method of claim 1, further comprising receiving, from the second SMF, a second PDU session establish response message, wherein the first PDU session establish response message comprises information associated with the first group, and wherein the second PDU session establish response message comprises information associated with the second group.

6. The method of claim 5, further comprising transmitting, to the UE, a PDU session establish response message, wherein the PDU session establish response message comprises information associated with the received first PDU session establish response message and information associated with the received second PDU session establish response message.

7. A method of a first session management function (SMF) in a wireless communication system, the method comprising:

receiving, from an access and mobility management function (AMF), a protocol data unit (PDU) session establish request message; and transmitting, to the AMF, a PDU session establish response message, wherein the first SMF and a second SMF are selected based on PDU session establish request information for supporting a plurality of groups including a first group and a second group received from a user equipment (UE) by the AMF, and the first SMF matches the first group among the plurality of groups and the second SMF matches the second group among the plurality of groups, respectively, and wherein the PDU session establish request message comprises information associated with the first group and the second group among the PDU session establish request information for supporting the plurality of groups.

8. The method of claim 7, wherein a first quality of service (QoS) is configured for the first group and a second QoS is configured for the second group.

9. The method of claim 7, wherein the PDU session establish request message further comprises first partial indication information indicating that the first SMF controls the first group.

10. An access and mobility management function (AMF) in a wireless communication network, the AMF comprising:

a transceiver configured to transmit or receive a signal; and a controller operably coupled to the transceiver, the controller configured to:

receive, from a user equipment (UE), protocol data unit (PDU) session establish request information for supporting a plurality of groups, transmit a first PDU session establish request message to a selected first session management function (SMF) and a second PDU session establish request message to a selected second SMF, respectively, and receive, from the first SMF, a first PDU session establish response message, wherein the first SMF that matches a first group is selected among the plurality of groups and the second SMF that matches a second group is selected among the plurality of groups, respectively, based on the received PDU session establish request information, wherein the first PDU session establish request message comprises information associated with the first group and the second group among the PDU session establish request information for supporting the plurality of groups, and wherein the second PDU session establish request message comprises information associated with the first group and the second group among the PDU session establish request information for supporting the plurality of groups.

11. The AMF of claim 10, wherein a first quality of service (QoS) is configured for the first group and a second QoS is configured for the second group.

12. The AMF of claim 10, wherein the first PDU session establish request message further comprises first partial indication information indicating that the first SMF controls the first group, and wherein the second PDU session establish request message further comprises second partial indication information indicating that the second SMF controls the second group.

13. The AMF of claim 12, wherein the first PDU session establish request message further comprises an SMF list, wherein the second PDU session establish request message further comprises the SMF list, and wherein the SMF list comprises information associated with the first SMF and information associated with the second SMF.

14. The AMF of claim 10, wherein the controller is further configured to receive, from the second SMF, a second PDU session establish response message, wherein the first PDU session establish response message comprises information associated with the first group, and wherein the second PDU session establish response message comprises information associated with the second group.

15. The AMF of claim 14, wherein the controller is further configured to transmit, to the UE, a PDU session establish response message, and wherein the PDU session establish response message comprises information associated with the received first PDU session establish response message and information associated with the received second PDU session establish response message.

16. A first session management function (SMF) in a wireless communication network, the first SMF comprising:
a transceiver configured to transmit or receive a signal; and
a controller operably coupled to the transceiver, the controller configured to:
receive, from an access and mobility management function (AMF), a protocol data unit (PDU) session establish request message, and
transmit, to the AMF, a PDU session establish response message,
wherein the first SMF and a second SMF are selected based on PDU session establish request information for supporting a plurality of groups including a first group and a second group received from a user equipment (UE) by the AMF, and the first SMF matches the first group among the plurality of groups and the second SMF matches the second group among the plurality of groups, respectively, and wherein the PDU session establish request message comprises information associated with the first group and the second group among the PDU session establish request information for supporting the plurality of groups.

17. The first SMF of claim 16, wherein a first quality of service (QoS) is configured for the first group, and a second QoS is configured for the second group.

18. The first SMF of claim 16, wherein the PDU session establish request message further comprises first partial indication information indicating that the first SMF controls the first group.

19. The method of claim 1, wherein the PDU session establish request information comprises information on a data network name (DNN) associated with the first group and the second group among the plurality of groups.

20. The AMF of claim 10, wherein the PDU session establish request information comprises information on a data network name (DNN) associated with the first group and the second group among the plurality of groups.

* * * * *